(12) United States Patent
Levinson et al.

(10) Patent No.: US 10,504,282 B2
(45) Date of Patent: Dec. 10, 2019

(54) GENERATING MAPS WITHOUT SHADOWS USING GEOMETRY

(71) Applicant: Zoox, Inc., Menlo Park, CA (US)

(72) Inventors: Jesse Sol Levinson, Redwood City, CA (US); Ashutosh Gajanan Rege, San Jose, CA (US); Brice Rebsamen, San Jose, CA (US); Elena Stumm, San Francisco, CA (US); Nitesh Shroff, Millbrae, CA (US); Derek Adams, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 15/927,870

(22) Filed: Mar. 21, 2018

(65) Prior Publication Data

US 2019/0295315 A1 Sep. 26, 2019

(51) Int. Cl.
*G06T 15/80* (2011.01)
*G06T 17/20* (2006.01)

(52) U.S. Cl.
CPC .............. *G06T 15/80* (2013.01); *G06T 17/20* (2013.01)

(58) Field of Classification Search
CPC ................................ G06T 15/80; G06T 17/20
See application file for complete search history.

(56) References Cited

U.S. PATENT DOCUMENTS

| 9,462,945 | B1 | 10/2016 | Barriga et al. |
| 2004/0208385 | A1 | 10/2004 | Jiang |
| 2006/0013454 | A1 | 1/2006 | Flewelling et al. |
| 2007/0036432 | A1 | 2/2007 | Xu et al. |
| 2010/0046843 | A1* | 2/2010 | Ma ..................... G06K 9/00657 382/224 |
| 2011/0154811 | A1 | 6/2011 | Simonnin |
| 2012/0008021 | A1 | 1/2012 | Zhang et al. |
| 2013/0009950 | A1* | 1/2013 | Ben-David ............. G06T 15/04 345/419 |

(Continued)

FOREIGN PATENT DOCUMENTS

CN 104463853 A 3/2015

OTHER PUBLICATIONS

PCT Search Report and Written Opinion dated Jun. 20, 2019, for PCT Application No. PCT/US2019/021553, 8 pages.

(Continued)

*Primary Examiner* — William A Beutel
(74) *Attorney, Agent, or Firm* — Lee & Hayes, P.C.

(57) ABSTRACT

Techniques for generating maps without shadows are discussed herein. A plurality of images can be captured by a vehicle traversing an environment representing various perspectives and/or lighting conditions in the environment. A shadow within an image can be identified by a machine learning algorithm trained to detect shadows in images and/or by projecting the image onto a three-dimensional (3D) map of the environment and identifying candidate shadow regions based on the geometry of the 3D map and the location of the light source. Shadows can be removed or minimized by utilizing blending or duplicating techniques. Color information and reflectance information can be added to the 3D map to generate a textured 3D map. A textured 3D map without shadows can be used to simulate the environment under different lighting conditions.

20 Claims, 9 Drawing Sheets

(56) References Cited

U.S. PATENT DOCUMENTS

| | | | |
|---|---|---|---|
| 2015/0002692 A1* | 1/2015 | Cabral | H04N 9/735 |
| | | | 348/223.1 |
| 2015/0097834 A1* | 4/2015 | Ma | G06T 17/05 |
| | | | 345/426 |
| 2015/0199579 A1* | 7/2015 | Stainvas Olshansky | |
| | | | G06K 9/4642 |
| | | | 382/104 |
| 2015/0248590 A1 | 9/2015 | Li et al. | |
| 2017/0356993 A1 | 12/2017 | Lee et al. | |
| 2018/0047208 A1* | 2/2018 | Marin | G06T 11/001 |
| 2018/0176531 A1* | 6/2018 | Liu | G06T 5/005 |
| 2018/0188026 A1* | 7/2018 | Zhang | G06T 7/11 |
| 2019/0051039 A1* | 2/2019 | Tsuru | G06T 15/80 |
| 2019/0295318 A1 | 9/2019 | Levinson et al. | |

OTHER PUBLICATIONS

Office Action for U.S. Appl. No. 15/927,806, dated Oct. 10, 2019, Levinson, "Generating Maps without Shadows", 24 pages.

\* cited by examiner

GENERATING MAPS WITHOUT SHADOWS USING GEOMETRY

BACKGROUND

Various maps can be utilized by autonomous vehicles to guide the autonomous vehicles through environments. In some cases, map data may be derived from image data including information associated with shadows that were present at the time of capturing the image data. Such shadows can be distracting or can cause confusion when referencing the map as the shadows may not be present in all conditions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
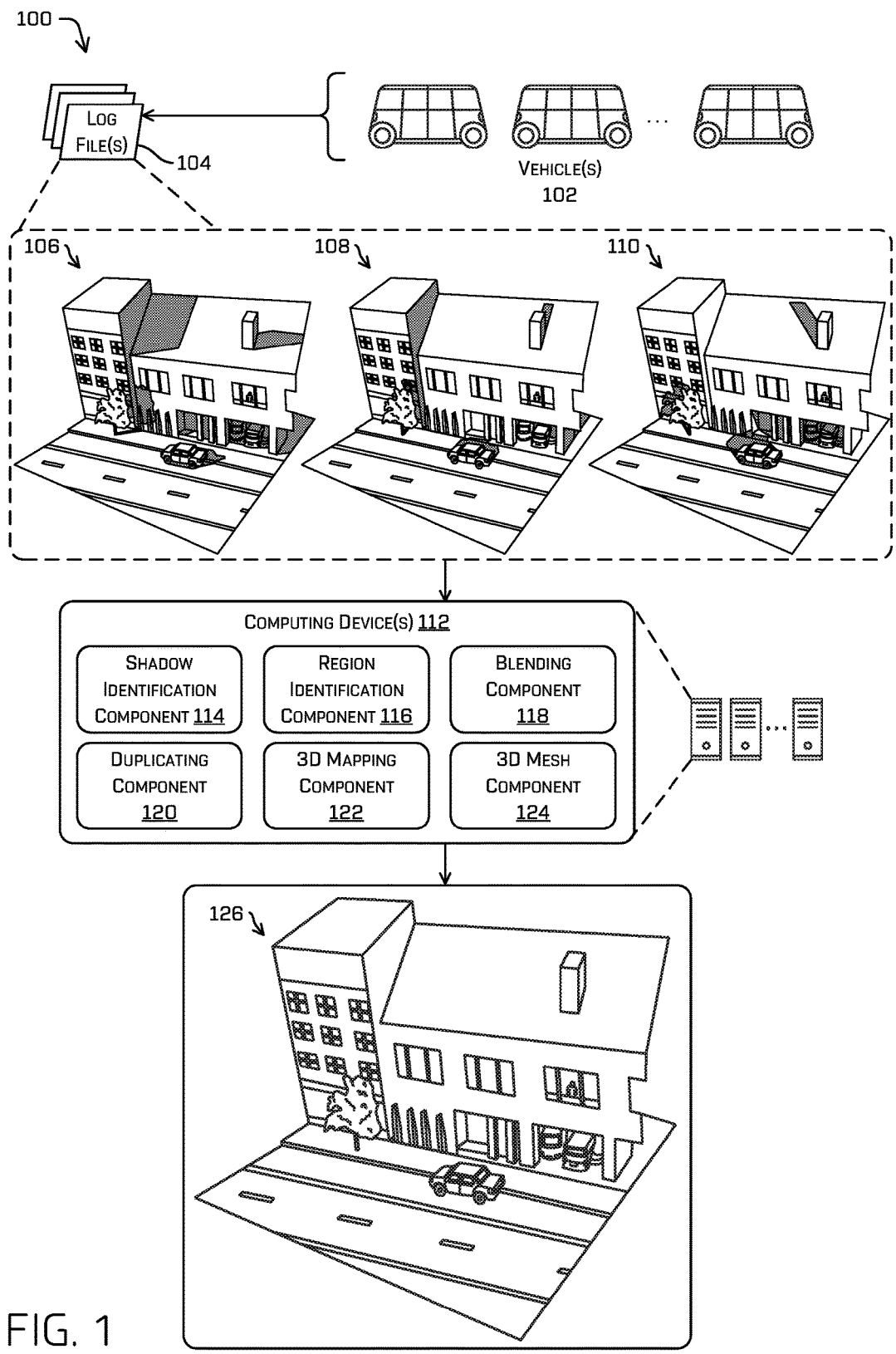
FIG. 1 is a pictorial flow diagram of an example process for capturing data of an environment, sending the data to a computing device, and generating a map of the environment without shadows, in accordance with embodiments of the disclosure.

This disclosure is directed to generating maps with shadows removed or minimized. As introduced above, images captured in an environment often include shadows present in the environment. Previous techniques for generating maps have utilized images with shadows, which can lead to inaccurate maps and can cause confusion or distraction to a viewer, or can potentially result in difficulties in localizing a vehicle using the map or difficulties in performing segmentation and/or classification. In some instances, a plurality of images can be captured in an environment representing various perspectives and/or lighting conditions. The images can be captured by an autonomous vehicle, an unmanned aerial vehicle (UAV) or the like, as the vehicle traverses the environment. In some cases, a shadow within an image can be identified by a machine learning algorithm trained to detect shadows in images. In some instances, the image can be projected onto a three-dimensional (3D) map of the environment and the shadow can be identified based on a known location of a light source and the geometry of the environment. After a shadow is identified, it can be removed and replaced with image data generated by blending corresponding regions captured in the plurality of images, and/or it can be removed and replaced with image data of another region having a same semantic classification and/or similar intensity of LIDAR data. Further, in some examples, after a shadow is identified, image processing techniques (e.g., changing brightness, color, hue, color temperature, contrast, etc.) can be used to remove or minimize a contribution of the shadow from image data. Once a textured 3D map of an environment has been generated with one or more shadows omitted, the textured 3D map can be used in connection with simulating the environment under different lighting conditions, for example.

In some cases, the plurality of images can be provided to a machine learning algorithm trained to identify scenes of diffuse lighting, such as a cloudy day. A score or other indication can be associated with individual images representing an amount of shadows present in an image. In some instances, images having a score or indication representing a cloudy day can be weighted more or less heavily when blending image data to generate a region of an image with a shadow omitted. In some instances, the score or indication representing a cloudy day can be used to select image data for map generation without or without the blending and/or duplicating techniques applied to the image data, as discussed herein.

Image data representing a shadow can be removed from an image and replaced with image data representing a surface without a shadow. Such removal and replacement can be referred to as "duplicating," and may be used to copy texture information (e.g., color data, reflectance data, and the like) from a first region to add or duplicate the texture information into the region previously representing a shadow. In some instances, duplicating can be based at least in part on semantic information associated with the various regions. For example, in some instances, image data of a region having a semantic classification can be used to replace image data of a shadowed region having the same semantic classification. As a non-limiting example, some or all regions of a map associated with a "sidewalk" may have the same or similar image data applied. Additionally or alternatively, the duplicating operations can be based at least in part on similarity of color information, geometry, location information, and the like.

Further, LIDAR data (e.g., intensity of a LIDAR return signal) and/or image data (e.g., reflectance of a surface based on a known location of a light source) can be used to determine reflectance characteristics of a surface. In one example, a vehicle can capture LIDAR data using one or more LIDAR sensors as the vehicle traverses an environment. An intensity of the received LIDAR data can be evaluated as a function of an angle of incidence with respect to a point in the environment to determine the reflectance characteristics of points in the environment. In some examples, an intensity of image data can be evaluated as a function of an angle of incidence and/or a known location of a light source to determine the reflectance characteristics of points in the environment. In some examples, individual points and/or surfaces within an environment can be classified as Lambertian surfaces (e.g., matte, diffuse, etc.), specular surfaces (e.g., glossy), mirrored surfaces, and the like. In some instances, the reflectance characteristics can include a bidirectional reflectance distribution function (BRDF).

The map generation techniques discussed herein can improve a functioning of a computing device by providing a photorealistic representation of an environment for observations and simulations. For example, shadow regions of an environment can be removed to generate less distracting or confusing maps of an environment, which can improve segmentation and/or classification in an environment. Generating a map without shadows allows any arbitrary lighting to be simulated and represented in a photorealistic manner (or any other manner). Further, a map without shadows (or with at least a portion of one or more shadows minimized or removed) can be provided to a vehicle for localizing the vehicle within an environment, and such maps without shadows can improve an accuracy and/or speed of localizing a vehicle using such a map. In some instances, generating a map without shadows while adding synthetic shadows in a simulator, for example, can require less memory and/or processing compared to techniques utilizing maps having fixed shadows, while selecting a particular image with a fixed shadow to representing a lighting condition. Further, the machine learning algorithms discussed herein (e.g., for identifying shadow regions, identifying diffuse lighting conditions, etc.) can reduce manual image processing and/or labeling of data. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems using maps, and is not limited to autonomous vehicles. In another example, the techniques may be utilized in an aviation or nautical context, as well as in virtual reality or video gaming applications. Additionally, the techniques described herein may be used with real data (e.g., captured using sensor(s)), simulated data (e.g., generated by a simulator), or any combination of the two.

FIG. 1 is a pictorial flow diagram of an example process 100 for capturing data of an environment, sending the data to a computing device, and generating a map of the environment without shadows, in accordance with embodiments of the disclosure.

In the example shown, a plurality of vehicles 102 traverse an environment. In some instances, a vehicle of the vehicles 102 can be an autonomous vehicle. As the vehicles 102 traverse the environment, the vehicles 102 can capture sensor data as part of navigating within the environment. As can be understood, the vehicles 102 can utilize a previously-generated map to traverse the environment (e.g., utilizing simultaneous localization and mapping (SLAM) techniques). The vehicles 102 can generate various log file(s) 104 representing sensor data captured by individual vehicles of the vehicles 102. For example, a log file of the log file(s) 104 can include, but is not limited to, sensor data captured by one or more sensors of the vehicles 102 (e.g., LIDAR sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, the log file(s) 104 can include a log of all sensor data captured by the vehicle(s) 102, decisions made by the vehicle(s) 102, determinations made regarding segmentation and/or classification, and the like.

As illustrated, the log files(s) 104 can include image data representing an environment including a variety of shadows. For example, image data 106, 108, and 110 represent the environment having different shadows, discussed below in connection with FIG. 2, and throughout this disclosure. As can be understood, the image data 106, 108, and 110 can represent the environment captured under different lighting conditions, on different days, from different perspectives, from different vehicles, and the like.

The log files(s) 104 including the image data 106, 108, and 110 can be sent to and received by one or more computing device(s) 112. In general, and in some instances, the computing device(s) 112 can include various components to perform various processing and/or operations on the log file(s) 104. For example, the computing device(s) 112 can include a shadow identification component 114, a region identification component 116, a blending component 118, a duplicating component 120, a 3D mapping component 122, and a 3D mesh component 124.

The shadow identification component 114 can include functionality to receive image data and detect regions(s) within the image data corresponding to a shadow. In some instances, the shadow identification component 114 can provide an indication of image coordinates associated with a shadow, and in some instances, the shadow identification component 114 can provide a score, confidence level, and/or uncertainty associated with the identification of a shadow. In some instances, the shadow identification component 114 can include a machine learning algorithm trained to detect shadows within images. In some instances, the identification and/or determination of a shadow can utilize geometry information of an environment (as may be provided by a map), as discussed herein. In some instances, the shadow identification component 114 can utilize one or more edge detection algorithms to determine differences in color values associated with shadows. In some instances, the shadow identification component 114 can identify regions of shadows as one or more of an umbra region, penumbra region, and antumbra region.

The region identification component 116 can include functionality to identify corresponding regions (e.g., corresponding to the same surface or area across a plurality of image data) in a plurality of images. For example, the region identification component 116 can receive location information (e.g., image coordinates) from the shadow identification component 114 identifying a shadow region (or a candidate shadow region) in a first image of a plurality of images. The region identification component 116 can determine one or more regions in a map corresponding to the candidate shadow region in the plurality of images. That is, in some instances, a shadowed region can be identified in a first image and corresponding regions (such as non-shadowed regions) can be identified by mapping an image region in a first image to the same corresponding region in a second image. As a non-limiting example, by utilizing image sensor intrinsics and extrinsics, in addition to a known localization of the system or vehicle, shadow regions determined in image space for a single image can be associated with corresponding regions on a map. As would be understood by a person having ordinary skill in the art, the corresponding region in the map may be projected into further image data to determine additional images that have captured the same region. That is, if a first candidate shadow region is associated with a particular location in a first image, the region identification component 116 can identify the corresponding region in other images of the same environment.

In some instances, the region identification component 116 can utilize LIDAR information, GPS information, etc., associated with the log file(s) 104 for determine corresponding regions. In some instances, the region identification component 116 can utilize functionality discussed herein to project an image onto a 3D mesh of an environment, determine image coordinates, mesh coordinates (e.g., vertices, polygons, voxels, etc.) and/or surfaces on which the image data corresponding to a shadow is projected, and identify corresponding regions in other images projected onto the same environment in the 3D mesh. In some instances, image data captured from a first perspective can be mapped to a 3D mesh, while image data captured from a second perspective (and reflecting the same environment) can be mapped to the same 3D mesh. Accordingly, the 3D mesh can be used to identify regions in image data that reflect the same region of the 3D mesh. In some instances, the region identification component 116 can use one or more algorithms including, but not limited to, Harris Corner detector, scale invariant feature transform (SIFT) (and derivatives, such as, but not limited to speeded up robust Features (SURF)), features from accelerated segment test (FAST), binary robust independent elementary features (BRIEF), oriented FAST and rotated BRIEF (ORB), bag of words, maximally stable extremal regions (MSER) (and derivatives), and the like.

The blending component 118 can include functionality to receive identification information of candidate shadow regions and/or corresponding regions in a plurality of images to perform blending operations on image data. In some instances, the blending operations can include a median filtering operation to determine average values of image data to "blend out" the contribution of a shadow in the image data. That is, the blending component 118 can combine image data of a plurality of corresponding regions captured from different perspectives, different times, under different lighting conditions, etc. to generate an updated region without a shadow. In some instances, the blending component 118 can assign weights to individual regions while blending based on a confidence value that a region does not include a shadow. In some instances, the blending component 118 can receive information indicating a level of diffuse lighting (e.g., on cloudy days) to weight image data more heavily or less heavily based on the ambient light levels in an environment. In some instances, the blending component 118 can use algorithms including, but not limited to, alpha blending, pyramid blending, Poisson blending, feathering, and the like.

In some instances, the blending component 118 can use image processing techniques to remove or minimize a contribution of a shadow from image data. For example, a brightness of a candidate shadow region can be adjusted to lighten a region associated with a shadow. In some instances, image processing techniques can include, but are not limited to: gamma correction; luminance correction; white balance; color scaling (e.g., RGB scaling); color temperature correction; contrast correction; brightness correction; and the like. In some instances, image processing techniques can be applied to image data in addition to or instead of the blending and/or duplicating techniques discussed herein. In some instances, the image processing techniques can be selected based at least in part on a machine learning algorithm trained to minimize shadows in an image, and/or based at least in part on a classification of a shadow and/or a known color or texture of a surface.

The duplicating component 120 can include functionality to replace image data corresponding to a shadow with image data corresponding to another location in the environment. In one example, if a shadow partially covers a wall, image data corresponding to a region without shadows (such as another portion of the wall) can be used as a source of image data to replace the image data corresponding to the shadow (e.g., a destination). As discussed herein, in some instances, determining a source and destination for image data for the duplicating component 120 can be based at least in part on semantic information (such as a semantic classification), color information, and/or LIDAR information (e.g., regions that have a similar LIDAR intensity may correspond to the same material). In some instances, a source of image data may be from the same image as the destination for image data, while in some instances, the source and destination for image data can be different images of a plurality of images.

In some instances, the blending component 118 and/or the duplicating component 120 can perform blending and/or duplicating based at least in part on semantic information associated with image data and/or the 3D mesh. In some instances, the semantic information can include semantic classifications including, but not limited to, road, curb, sidewalk, grass, tree, tree trunk/branch, foliage (e.g., leaves), building, wall, fire hydrant, mailbox, pole, post, pedestrian, bicyclist, animal (e.g., dog), and the like. In some instances, the semantic information can provide an indication of whether the pixel, polygon, voxel, object, or element represents a static object, dynamic object, stationary dynamic object (e.g., a parked car), etc. In some instances, the semantic information can include an object identifier to distinguish between different instances of the same semantic classification (e.g., tree #1, tree #2, etc.).

In some instances, the blending component 118 and the duplicating component 120 can be used independently and/or in combination throughout an image to generate an image of an environment without shadows, as discussed herein. For example, a duplicating operation can be used to remove a (center) portion of a shadow from a candidate shadow region, while the blending operation can be used to blend the transition between the duplicated region and other image data. For example, a blending operation can be used to combine duplicated image data and image data in an original, underlying image.

The 3D mapping component 122 can include functionality to map or project image data onto a three-dimensional mesh of an environment and/or use image data to localize against the map. For example, the 3D mapping component 122 can receive, generate, or otherwise obtain a 3D mesh of an environment (e.g., from the 3D mesh component 124, discussed herein) and can project image data onto the corresponding location on the 3D mesh. In some instances, the 3D mapping component 122 can map a plurality of images onto the 3D mesh, with individual images represented as a channel of the 3D mesh, such that individual images can be "stacked" on the 3D mesh for subsequent processing, such as blending or duplicating, as discussed herein. Localization and mapping may be performed by similar techniques (such as SLAM) using any visual features, as discussed herein.

The 3D mesh component 124 can include functionality to receive, generate, or otherwise obtain a 3D mesh of an environment. In some instances, the 3D mesh component 124 can receive the log file(s) 104 and generate a three-dimensional (3D) map based on the data in the log file(s) 104. For example, the 3D mesh component 124 can receive LIDAR data, image sensor data, GPS data, IMU data, radar data, sonar data, etc. and can combine the data to generate a 3D mesh of the environment. With respect to LIDAR data, the 3D mesh component 124 can receive a plurality of point clouds of data and can combine the data to represent an environment as captured by the vehicle(s) 102. Similarly, image data (whether monocular, stereo, multi-view, depth camera, or the like) may be combined to generate data similar to a LIDAR output for generating 3D geometries of an environment. In some instances, the 3D mesh component 124 can generate a mesh based on the sensor data included in the log file(s) 104. Examples of techniques used to generate a mesh of an environment include, but are not limited to, marching cubes, screened Poisson surface reconstruction, Delaunay triangulation, tangent plane estimation, alpha shape algorithm, Cocone algorithm, PowerCrust algorithm, ball pivoting algorithm, surface interpolated methods, and the like. As can be understood, the 3D mesh component 124 can generate a 3D map including a mesh, wherein the mesh includes a plurality of polygons that define the shape of objects in the environment.

In some instances, and as discussed herein, the 3D mesh component 124 can generate a map based on voxels, histograms, signed distance functions (including truncated signed distance functions), point clouds, and is not limited to generating meshes. In some instances, aspects of a map based on voxels, histograms, point clouds, and the like, can be referred to as elements. Further, in some instances, surfaces and objects can be represented as parameterized objects (e.g., non-uniform rational basis spline (NURBS) surfaces). Further, although the 3D mesh component 124 is discussed in the context of three dimensions, a mesh is not limited to three dimensional, and may include any number of dimensions, channels, etc. In some instances, the 3D mesh component 124 may be referred to more generally as a multi-dimensional mesh component.

As the computing device(s) 112 receives the log file(s) 104, the computing device(s) 112 can project images onto a 3D mesh to generate a textured 3D map of an environment, illustrated as a textured 3D map 126, as discussed herein. In some instances, the textured 3D map 126 can include geometry data of the environment (e.g., as the 3D mesh) and texture data (e.g., color values, reflectance values, etc.) associated with various polygons or image data mapped to the 3D mesh.

After generating the textured 3D map 126, the operations can include providing the textured 3D map 126 to a simulator component that can add shadows representing any arbitrary lighting, or to any other process which relies on or which can benefit from a shadow-free map.

Additional features of the shadow identification component 114, the region identification component 116, the blending component 118, the duplicating component 120, the 3D mapping component 122, and the 3D mesh component 124 are discussed in connection with FIG. 7, and throughout this disclosure.

Figure 2:
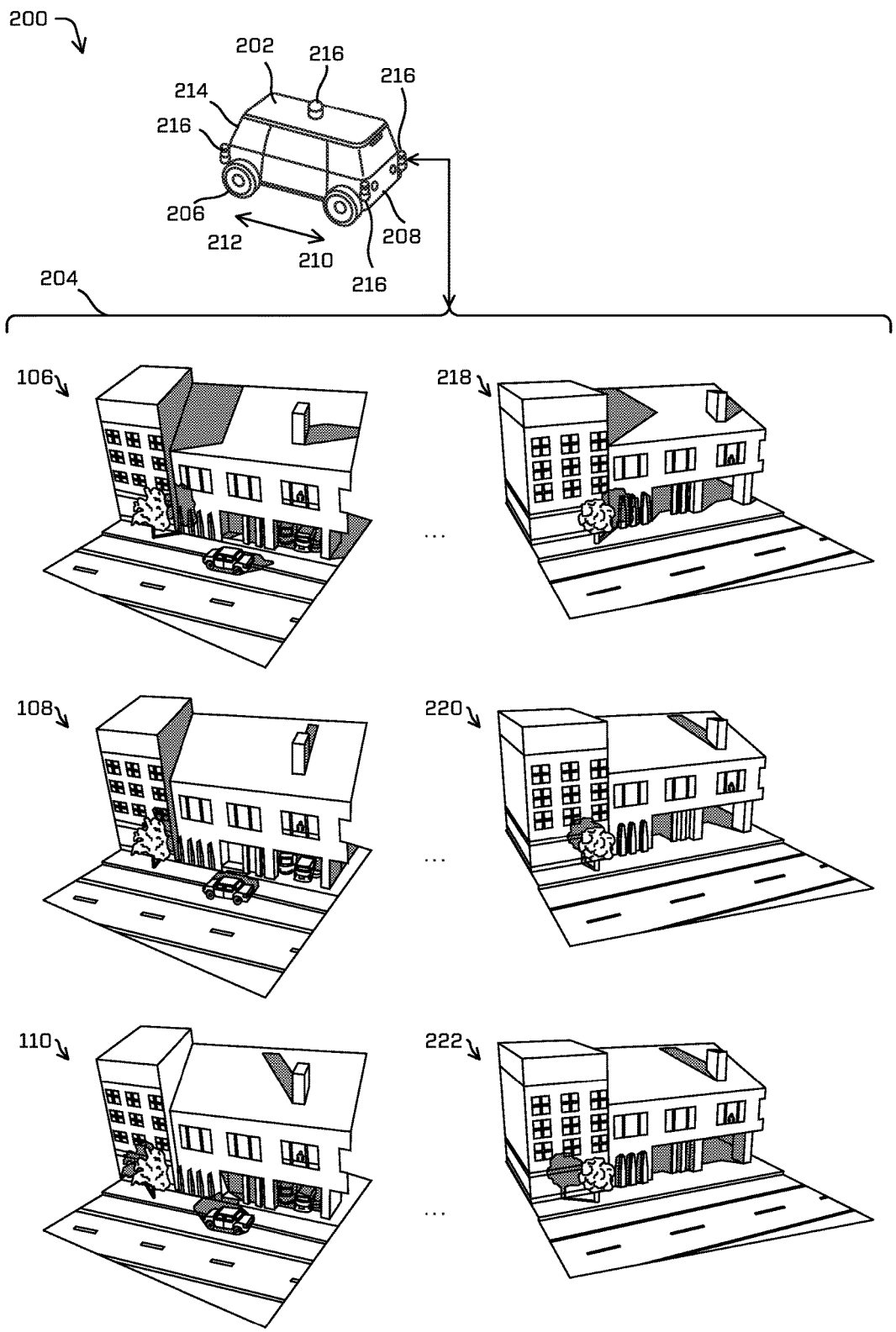
FIG. 2 depicts an example vehicle capturing image data of an environment and examples of such image data having shadows, in accordance with embodiments of the disclosure.

FIG. 2 depicts an example 200 of a vehicle capturing image data of an environment and examples of such image data having shadows, in accordance with embodiments of the disclosure. In the example shown, an example vehicle 202 travels through one or more environments 204. As illustrated, the vehicle 202 may capture the image data 106, 108, and 110 as the vehicle travels through the environment 204 at various times. In some instances, the vehicle 202 may be an autonomous vehicle, such as the example vehicle described herein with respect to FIGS. 1 and 8, though any vehicle, system, or device capable of capturing image data in an environment is contemplated (e.g., pedestrians having camera enabled smart phones, including those with GPS). Although the example vehicle 202 is illustrated as having four wheels 206, the systems and methods described herein may be incorporated into vehicles having fewer or a greater number of wheels, tires, and/or tracks. The example vehicle 202 may have four-wheel steering and may operate generally with substantially equal performance characteristics in all directions, for example, such that a first end 208 of the vehicle 202 is the front end of the vehicle 202 when traveling in a first direction 210, and such that the first end 208 becomes the rear end of the vehicle 202 when traveling in the opposite, second direction 212, as shown in FIG. 2. Similarly, a second end 214 of the vehicle 202 is the front end of the vehicle 202 when traveling in the second direction 212, and such that the second end 214 becomes the rear end of the vehicle 202 when traveling in the opposite, first direction 210. These example characteristics may facilitate greater maneuverability, for example, in small spaces or crowded environments, such as parking lots and urban areas.

A vehicle such as the example vehicle 202 may travel through the environment 204 and capture image data 106, 108, and 110 of an environment. As illustrated, the image data 106, 108 and 110 represents the environment 204 captured at different times representing different lighting conditions. Accordingly, the features of the environment 204 produce different shadows across the environment 204, as illustrated by the shadows in the image data 106, 108, and 110.

Further, the example vehicle 202 can captured additional images 218, 220, and 222 of the environment 204. In some instances, the images 218, 220, and 222 represent the same environment 204 as the images 106, 108, and 110, but illustrate that the images can be captured from different perspectives and/or time of the year. Further, different images may include representations of different dynamic objects, static objects, foliage, etc., which may represent different shadows and/or textures of the environment 204. In one example, the image data 218 represents similar shadows as represented in the image data 106 but from a different perspective. Similarly, the image data 218 can correspond to another perspective of the image data 108, while the image data 222 can correspond to another perspective of the image data 110. Of course, image data from any perspective representing any level of shadows or objects can be captured.

Further, the vehicle 202 may travel through the environment 204 and collect data for updating a map (e.g., creating a map and/or revising an existing map) and/or for localizing the vehicle 202 within the map. For example, the vehicle 202 may include one or more sensors 216 configured to capture datasets representative of the environment 204 as the vehicle 202 travels through the environment 204. In the example shown in FIG. 2, the sensor(s) 216 and associated description are described in relation to use of one or more LIDAR sensors. Although discussed in the context of image sensors and/or LIDAR sensors and/or in the context of an autonomous vehicle, the methods, apparatuses, and systems described herein may be applied to a variety of systems utilizing, for example, machine vision. In addition, although described in relation to image data or three-dimensional LIDAR data, the methods, apparatuses, and systems described herein are not limited to image data, three-dimensional data, and are not limited to image data or LIDAR data. For example, the one or more sensors may be one or more radar sensors, one or more ultrasonic transducers, one or more imagers (e.g., stereoscopic cameras, depth cameras, time of flight cameras, etc.), and/or any sensor types configured to generate sensor datasets representative of the environment. In some examples, the methods, apparatuses, and systems may be used for other purposes, for example, in a manufacturing assembly line context, or in an aerial surveying context. The datasets may include any number of layers or channels, which may correspond to any number of dimensions. In some examples, the techniques described herein may be used with actual data (e.g., captured using sensor(s)), simulated data (e.g., generated by a simulator), and/or combinations thereof.

Figure 3:
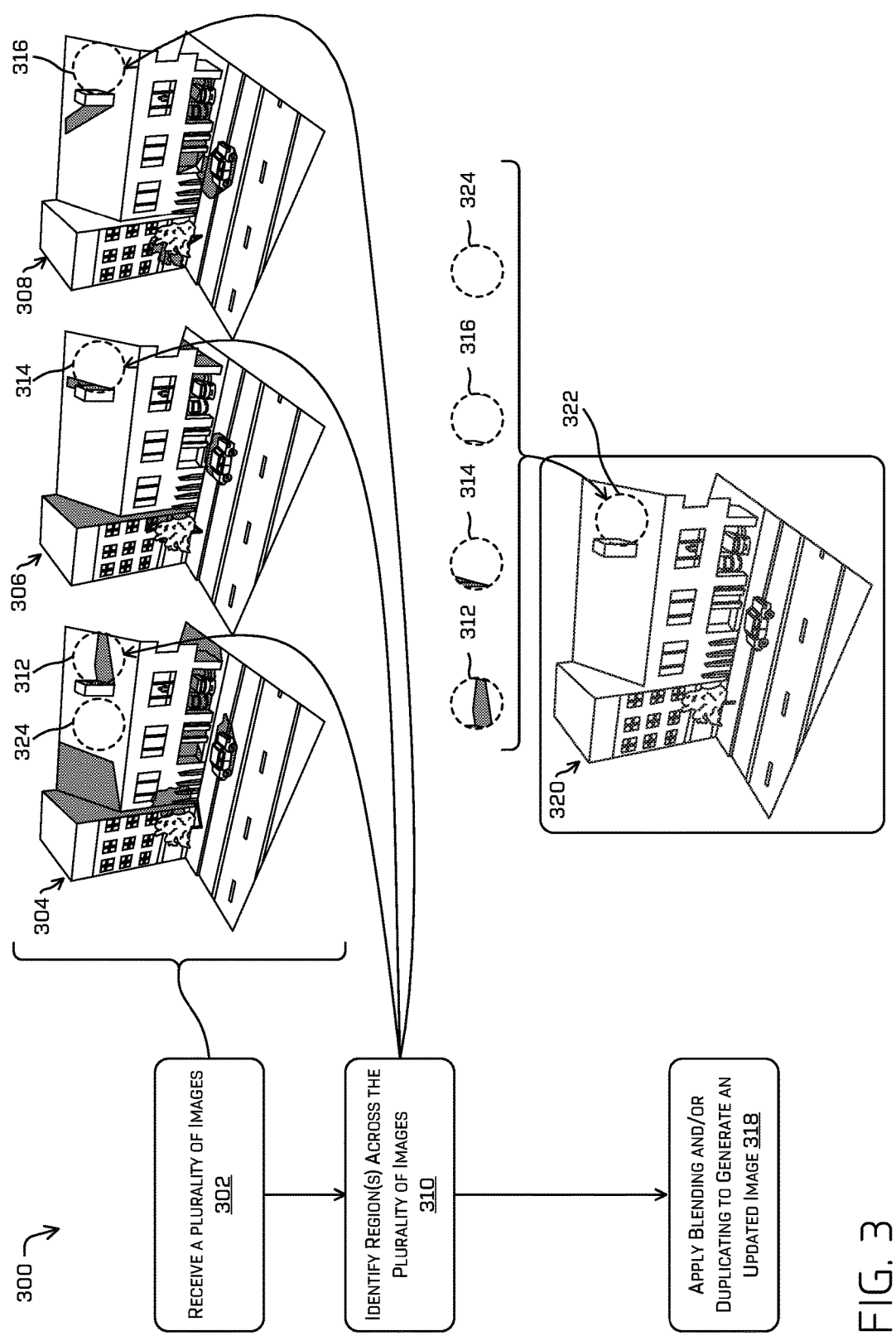
FIG. 3 is a pictorial flow diagram of an example process for receiving a plurality of images, identifying regions across the plurality of images, and applying blending and/or duplicating techniques to generate an updated image, in accordance with embodiments of the disclosure.

FIG. 3 is a pictorial flow diagram of an example process 300 for receiving a plurality of images, identifying regions across the plurality of images, and applying blending and/or duplicating techniques to generate an updated image, in accordance with embodiments of the disclosure.

At operation 302, the process can include receiving a plurality of images. In some examples, the plurality of images can be captured by one or more autonomous vehicles traversing an environment and sent to a computing device, as discussed herein. Examples of the plurality of images are illustrated as image data 304, 306, and 308. In some instances, the image data 304, 306, and 308 can correspond to the image data 106, 108, and 110. As can be seen in FIG. 3, the image data 304, 306, and 308 can represent the same environment taken at different times and with different shadows. By way of example and without limitation, the image data 304, 306, and 308 can be captured by the same or different vehicle over the course of a day, month, or year. Further, the image data 304, 306, and 308 can be captured from any perspective, and is not limited to the same perspective, as illustrated in FIG. 3. In some instances, the plurality of images can represent any number of images, and is not limited to merely three images.

At operation 310, the process can include identifying one or more regions across the plurality of images. In some instances, the operation 310 can include identifying one or more candidate shadow regions in one or more of the plurality of images. In some instances, the operation 310 can include providing the plurality of images to a machine learning algorithm trained to detect shadow regions in images. In some instances, the operation 310 can include determining candidate shadow regions based on the geometry of an image projected onto a 3D mesh and/or knowledge of light sources in the environment (e.g., knowledge of the location of the sun based on a precise time of day and localization of the system), as discussed herein. Further, in some instance, the operation 310 can include determining corresponding regions across the plurality of images.

By way of example, and without limitation, regions are identified in the image data 304, 306, and 308. In the image data 304, a candidate shadow region 312 is illustrated as representing a shadow cast by a portion of the building. As discussed above, in some examples, the candidate shadow region 312 can be identified via a machine learning algorithm trained to detect shadows. In some examples, the candidate shadow region 312 can be identified based at least in part on a known location of a light source and the geometry of the environment. In some instances, machine learning and the geometry of the environment can be used to identify the candidate shadow region 312. As can be understood, the image data 304 illustrates a plurality of shadows, and although particular shadows may not be labeled, each shadow (in each of the image data 304, 306, and 308) can be identified as a candidate shadow region.

Figure 6:
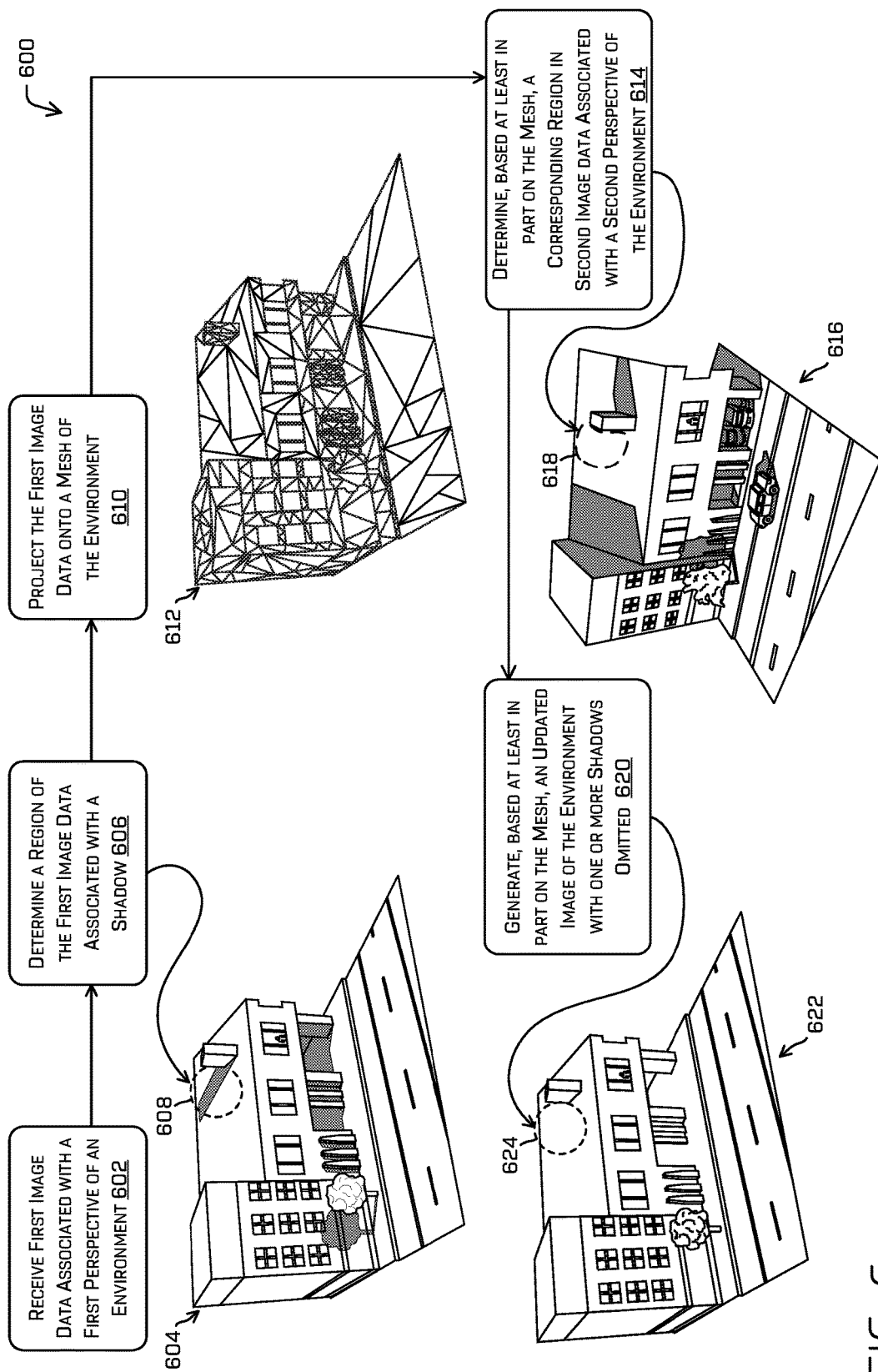
FIG. 6 is a pictorial flow diagram of an example process for receiving first image data associated with a first perspective including a shadow, projecting the first image data onto a mesh, determining a corresponding region in second image data associated with a second perspective, and generating an updated image of the environment without shadows, in accordance with embodiments of the disclosure.

As the candidate shadow region 312 is identified, the operation 310 can further include identifying corresponding regions in the plurality of images, as discussed in detail with respect to FIGS. 1 and 6, as well as throughout this disclosure. As illustrated, regions 314 and 316 substantially correspond to the location in the environment of the candidate shadow region 312. In some instances, corresponding regions can be identified based at least in part on known locations of the candidate shadow region with respect to a 3D mesh, and/or based on extracting features of a first image and identifying corresponding features is a second image, for example.

At operation 318, the process can include applying blending and/or duplicating to generate an updated image. As illustrated, the operation 318 can include generating an updated image 320 representing the environment without shadows. The updated image 320 can include an updated region 322 that includes image data formed by blending and/or duplicating image data, as discussed herein. In some examples, the updated image 320 can be referred to as a composite image as the update image 320 can include image data from a variety of sources. In one example, the image data associated with the regions 312, 314, and/or 316 can be blended via a median filtering algorithm to remove the contribution of shadows in the updated region. In one example, the regions 312, 314, and/or 316 can be associated with a score representing a probability or confidence level that the image data was captured under diffuse lighting conditions, which may reduce the chances of including shadowed regions. In some examples, the blending can be performed by not including data from the candidate shadow region 312, and instead can include data blended from the regions 314 and 316. Of course, the blending operations are not limited to the specific examples discussed herein.

In one example, the updated region 322 can be formed by duplicating operations. In one example, image data corresponding to the candidate shadow region 312 can be omitted and replaced entirely with image data from the region 316, which may not include a contribution from a shadow. In some examples, regions not corresponding to the location of the candidate shadow region 312 can be used as a source of data for the duplicating operation. As illustrated, a source region 324 can be identified in the image data 304 as being the same semantic classification as the region 312 (e.g., a "roof"), based on an intensity of LIDAR returns associated with the regions 312 and 324 (e.g., based on the intensity information being the same or within a threshold difference), color information, and/or based on a physical proximity of the regions 312 and 324, in addition to any other known technique (e.g., semantic segmentation). That is, sources of image data for duplicating operations are not limited to the precise location corresponding to the candidate shadow regions in the plurality of images, and can be selected based on a variety of factors.

Figure 4:
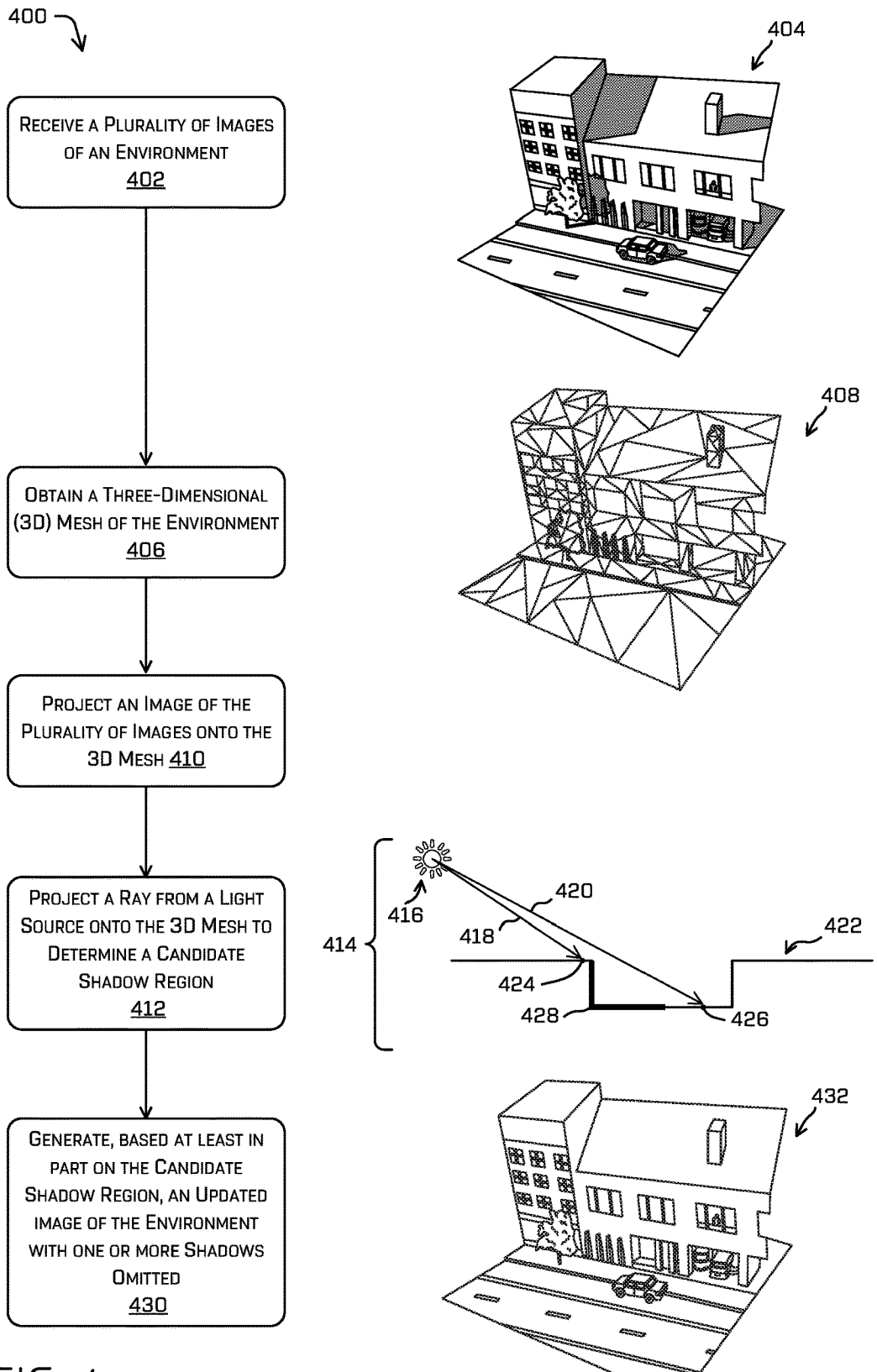
FIG. 4 is a pictorial flow diagram of an example process for receiving a plurality of images, obtaining a three-dimensional (3D) mesh, projecting an image onto the 3D map, and utilizing geometry of the 3D mesh to generate a map without shadows, in accordance with embodiments of the disclosure.

FIG. 4 is a pictorial flow diagram of an example process 400 for receiving a plurality of images, obtaining a three-dimensional (3D) mesh, projecting an image onto the 3D map, and utilizing geometry of the 3D mesh to generate a map without shadows, in accordance with embodiments of the disclosure.

At operation 402, the process can include receiving a plurality of images of an environment. As discussed above in connection with the operation 302, the plurality of images can be captured by one or more autonomous vehicles traversing an environment and sent to a computing device, as discussed herein, though any other capture mechanism is contemplated (e.g., UAV, smartphone, etc.). An example of an image of the plurality of images is illustrated as image data 404, which can correspond to the image data 106 and 404 as in FIGS. 1 and 4, respectively. As can be understood in the context of this disclosure, the images received in the operation 402 can represent the environment taken at different times and therefore can represent different shadows. By way of example and without limitation, the plurality of images can be captured by the same or different vehicle over the course of a day, month, or year. Further, the plurality of images can be captured from any perspective, and is not limited to the same perspective (e.g., as illustrated by the image data 304, 306, and 308 of FIG. 3).

At operation 406, the process can include obtaining a three-dimensional (3D) mesh of the environment. In some instances, the operation 406 can include receiving, generating, or otherwise obtaining the 3D mesh of the environment. In some instances, the 3D mesh can be generated by an autonomous vehicle as it navigates through an environment using a mapping algorithm such as SLAM. In some instances, a 3D mesh 408 represents the environment corresponding to the environment illustrated in the image data 404. As can be understood, the 3D mesh can be represented by any number of polygons (e.g., triangles, squares, rectangles, etc.), and is not limited to any particular shape. In some instances, the 3D mesh can represent a geometry of an environment.

In some instances, the 3D mesh 408 can include additional information, in addition to geometry information of an environment. For example, individual polygons of the 3D mesh 408 can include semantic information, LIDAR intensity information, and the like. Of course, additional information can be associated with the 3D mesh 408, and is not limited to the examples discussed herein. In some instances, the 3D mesh 408 can represent a 3D mesh that has been decimated to preserve boundaries between semantic classifications, and/or based on individual contributions of polygons for localizing a vehicle using the 3D mesh 408.

At operation 410, the process can include projecting an image of the plurality of images onto the 3D mesh. As discussed above, in some instances, as images are captured and/or received at a computing device, the images can be projected onto the 3D mesh 408 as individual channels of a multi-channel image. That is, the images can be texture mapped to the 3D mesh 408. Accordingly, each image can be projected or mapped onto the 3D mesh 408. In general, image data from a two-dimensional image (e.g., 404) can be mapped to individual polygons on the 3D mesh 408.

At operation 412, the process can include projecting a ray from a light source onto the 3D mesh to determine a candidate shadow region. An example 414 illustrates a light source 416 projecting a plurality of rays 418 and 420 onto a surface 422 of a 3D mesh. In some instances, the surface 422 represents a detail view of a portion of the 3D mesh 408. In some instances, a location of the light source 416 is determined based on the location associated with the 3D mesh 408 (e.g., latitude and longitude) as well as a time of day, time of year, etc. Further, the location of the light source 416 can be based at least in part on timing information associated with the image data 404. As non-limiting examples, a position of the sun can be determined based on location data and a precise time of day, positions of street lights, and the like can be determined.

As illustrated, the rays 418 and 420 have an origin associated with the light source 416 and are projected onto the surface 422 to intersect with the surface 422 at intersection points 424 and 426. As can be understood, and as discussed in connection with FIG. 5, locations of the surface 422 that are blocked or occluded by other surfaces from intersecting with the rays 418 and 420 can be considered to be candidate shadow region 428.

The operation 412 can be repeated over some or all aspects of the 3D mesh 408 to determine, based on the geometry of the mesh and based on the location of the light source 416, locations on the 3D mesh 408 that may include shadows in corresponding image data. Similarly, shadow regions may be determined for individual images from a dataset using localization of the image sensor and their respective intrinsics and extrinsics such that shadow regions are proposed in image space and not mesh (or map) space. In some instances, the operation 412 can identify coordinates and/or locations of the 3D mesh or in associated image data that include candidate shadow regions. That is, in some instances, images can be mapped to a 3D mesh and a candidate region can be determined based on a geometry of the 3D mesh. In some instances, a candidate region can be determined (e.g., via a machine learning algorithm) and the image data with an associated candidate region can be mapped to the 3D mesh.

At operation 430, the process can include generating, based at least in part on the candidate shadow region, an updated image of the environment with one or more shadows omitted. In some instances, image data corresponding to the candidate shadow regions can be removed using the blending and/or duplicating techniques discussed herein. In some instances, an updated image 432 can represent the same environment as the environment illustrated in the image data 404 but with one or more shadows omitted or removed, as discussed herein.

Figure 5A:
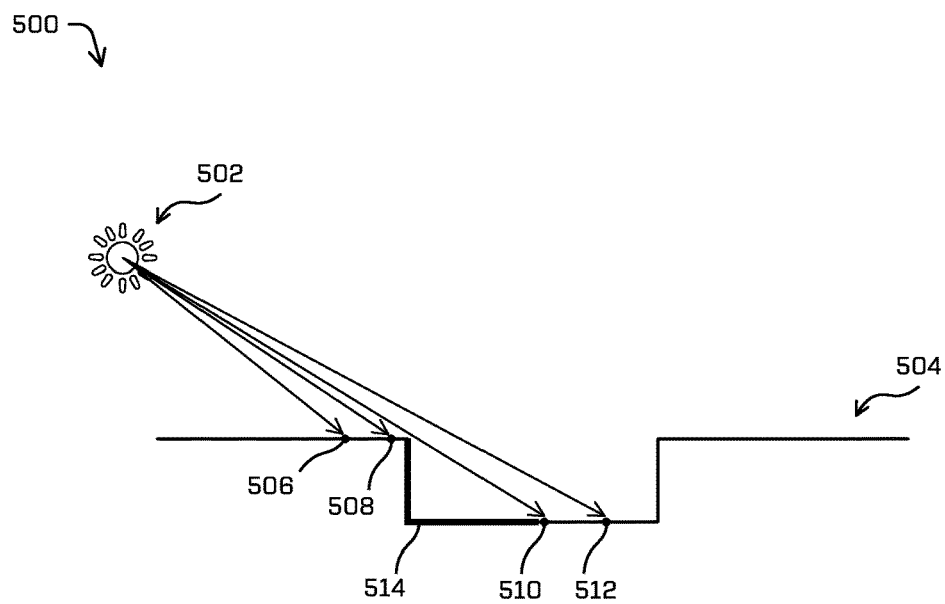
FIGS. 5A and 5B illustrate example techniques for projecting a ray from a light source onto a 3D mesh to determine candidate shadow regions on the 3D mesh, in accordance with embodiments of the disclosure.
Figure 5B:
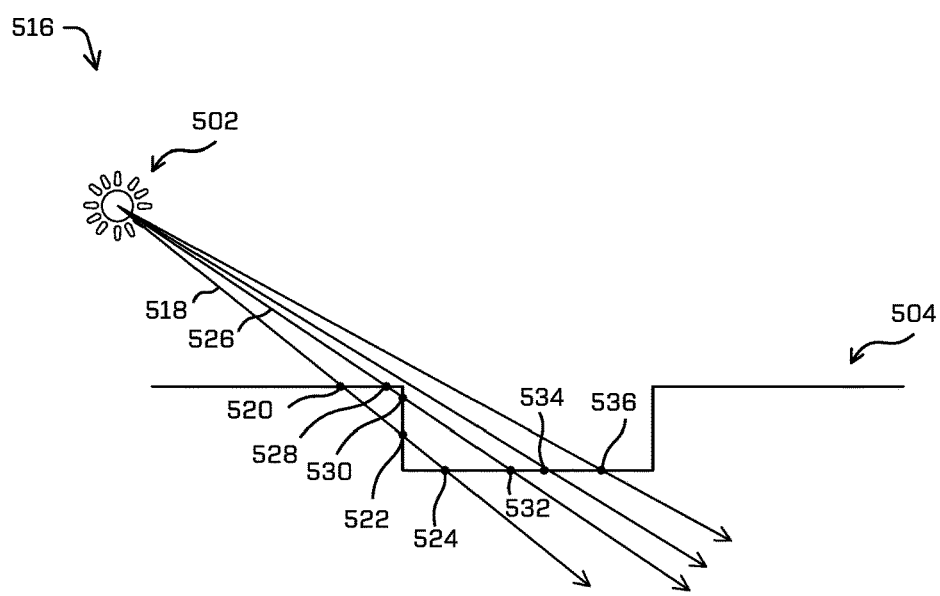

FIGS. 5A and 5B illustrate example techniques for projecting one or more rays from a light source onto a 3D mesh to determine candidate shadow regions on the 3D mesh, in accordance with embodiments of the disclosure.

FIG. 5A illustrates a first example 500 for projecting one or more rays from a light source 502 onto a 3D mesh 504 to determine candidate shadow regions on the 3D mesh. In some instances, the 3D mesh 504 can represent a 3D mesh of an environment, such as the 3D mesh 408 discussed in FIG. 4. In some instances, a plurality of rays can be projected from the light source 502 to intersect with the 3D mesh 504 at various intersection points 506, 508, 510, and 512. As illustrated, regions of the 3D mesh that are intersected by the rays may correspond to regions free of shadows, while regions of the 3D mesh without intersection points can be considered to be a candidate shadow region. As illustrated, a candidate shadow region 514 is illustrated as being bound by the intersection points 508 and 512.

FIG. 5B illustrates a second example 516 for projecting one or more rays from a light source 502 onto a 3D mesh 504 to determine candidate shadow regions on the 3D mesh 504. For example, the plurality of rays projected by the light source 502 can intersect with the 3D mesh 504 at a plurality of points, based on the geometry of the 3D mesh. For example, a ray 516 can intersect with the 3D mesh at points 520, 522, and 524. In some instances, a surface associated with the point 520 can represent an illuminated surface or region, while the surfaces associated with the points 522 and 524 can represent candidate shadow regions. Similarly, for a ray 526, an intersection point 528 can represent an illuminated surface or region, while points 530 and 532 can represent candidate shadow regions. In other words, rays projected through a mesh which intersect the mesh multiple times may have shadow regions associated with subsequent intersections, whereas single intersections may be associated with an illuminated region. Because there are no intersection points between points 534 and 536 and the light source 502, respectively, surfaces or regions associated with the points 534 and 536 can be considered to be illuminated by the light source 502. As can be understood, a plurality of rays can be projected from the light source onto the 3D mesh 504 to determine candidate shadow regions and illuminated regions, as discussed herein.

In some instances, candidate shadow regions can be determined using one or more back-face culling algorithms, and the like. That is, a back-face culling algorithm can be used (e.g., from the perspective of a source of light to determine which surfaces of the 3D mesh 504 are visible from the perspective of the light source 502. In some instances, processing can include, but is not limited to, hidden surface removal (HSR) algorithms, occlusion culling (OC) algorithms, or visible surface determination (VSD) algorithms.

FIG. 6 is a pictorial flow diagram of an example process 600 for receiving first image data associated with a first perspective including a shadow, projecting the first image data onto a mesh, determining a corresponding region in second image data associated with a second perspective, and generating an updated image of the environment without shadows, in accordance with embodiments of the disclosure.

At operation 602, the process can include receiving first image data associated with a first perspective of an environment. An example 604 illustrates an example of an environment from a first perspective and representing a first plurality of shadows. The image data can be received, captured, or otherwise obtained as discussed herein.

At operation 606, the process can include determining a region of the first image data associated with a shadow. As illustrated, a region 608 on the example 604 illustrates a region of the environment including a shadow. In some instances, the region 608 can be determined using a machine learning algorithm as discussed herein. In some instances, the image data of the environment 604 can be mapped to a 3D mesh first and a candidate shadow region can be determined based on a geometry of the environment, as discussed herein (e.g., based on a time, localization information, a location of a light source, etc.).

In some instances, determining a region 608 in an image can include, but is not limited to, determining a position or orientation of the image capture device (e.g., the vehicle, UAV, image sensor, etc.), determining a location and illumination vector of a light source (e.g. based on a time, latitude/longitude of the image capture device, locations of other light sources in an environment (e.g., lamp posts)), and determining, based at least in part on a three dimensional map (e.g., the mesh 612), an area of the map visible to the image capture device and not illuminated by the light source.

At operation 610, the operation can include projecting the first image data onto a mesh of the environment. An example mesh 612 is illustrated as corresponding to the environment represented in the example 604. As discussed above, in some instances, image data can be mapped to the mesh 612 (e.g., a 3D mesh) before or after determining a candidate shadow region.

At operation 614, the operation can include determining, based at least in part on the mesh, a corresponding region in second image data associated with a second perspective. For example, image data 616 is shown illustrating the same environment represented in the example 604 but from a different perspective (and including different shadows). In some instances, the image data 616 may have been previously mapped to the same mesh 612, such that the geometry of the mesh 612 can be used to determined that the region 608 corresponds to a region 618 of the image data 616. In some instances, determining the region 618 can include projecting the region 608 into the image data 616 (e.g., based on the locations of the mesh)

At operation 620, the process can include generating, based at least in part on the mesh, an updated image of the environment with one or more shadows omitted. In an example 622, image data corresponding to the image data represented in the example 604 is shown with one or more shadows omitted. For example, a region 624 corresponding to the region 608 is illustrated with the shadow removed. In one example, image data represented in the region 618 can be warped, skewed, scaled, or otherwise transformed from the second perspective of the environment 616 to the first perspective of the example 604. That is, the known geometry of the mesh, as well as the known location and/or perspectives of the image data projected onto the mesh can be used to transform image data from a first perspective to a second perspective (or vice versa) to omit one or more shadows using the blending and/or duplicating techniques discussed herein.

Figure 7:
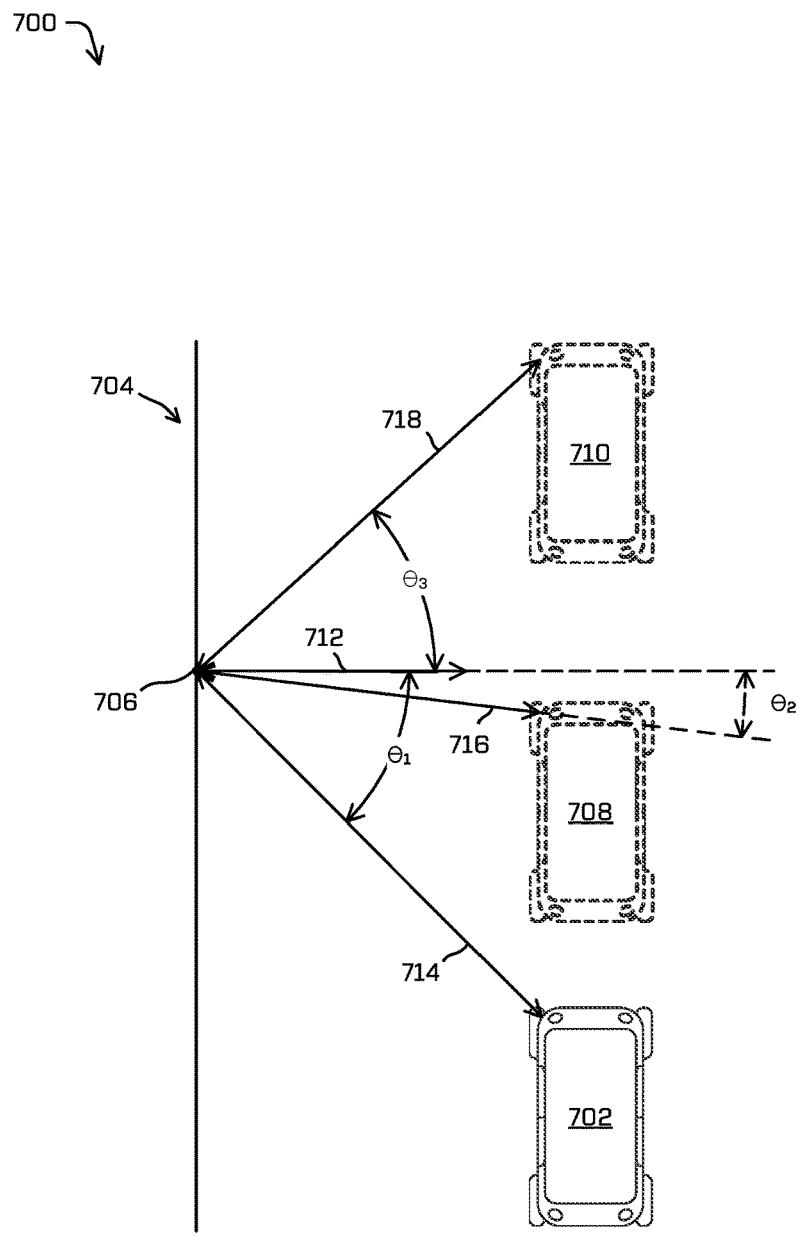
FIG. 7 illustrates a diagram for determining reflectance properties of a surface, in accordance with embodiments of the disclosure.

FIG. 7 illustrates a diagram 700 for determining reflectance properties of a surface, in accordance with embodiments of the disclosure. As illustrated, a vehicle 702 can traverse through an environment 704 capturing LIDAR data associated with a point 706 on a surface in the environment 704. The vehicle 702 is associated with a first time, a vehicle 708 represents the vehicle 702 at a second time, and a vehicle 710 represents the vehicle 702 at a third time.

A vector 712 represents a normal vector associated with the surface on which point 706 lies. LIDAR data captured by the vehicle 702 (represented by the segment 714) can indicate an intensity of a LIDAR return as a function of the angle of incidence (e.g., $\theta_1$) between the segment 714 and the normal vector 712 at the time of capturing the LIDAR data.

LIDAR data captured by the vehicle 708 (represented by the segment 716) can indicate an intensity of a LIDAR return as a function of the angle of incidence (e.g., $\theta_2$) between the segment 716 and the normal vector 712 at the time of capturing the LIDAR data.

LIDAR data captured by the vehicle 710 (represented by the segment 718) can indicate an intensity of a LIDAR return as a function of the angle of incidence (e.g., $\theta_3$) between the segment 718 and the normal vector 712 at the time of capturing the LIDAR data.

As LIDAR data associated with the point 706 is captured over time and over a variety of angles of incidence, a computing system (e.g., discussed in connection with FIG. 8) can determine a bidirectional reflectance distribution function (BRDF) for a surface. For example, the known angles of incidences, as well as the known intensity information, can be used to build a model of the surface representing the reflection of the surface with respect to an angle of a light source and a viewer.

Further, image data can be used to determine a BRDF of a surface. For example, a location of a light source (e.g., the sun) can be determined based on timing information and localization information associated with an image captured device capturing image data. Based on the angles of incidence and/or angles between the light source and image sensor over time, the reflectivity of the surface can be determined for the various surfaces. Accordingly, the BRDF and image data can be associated with the 3D map to generated a textured 3D map, as discussed herein.

Figure 8:
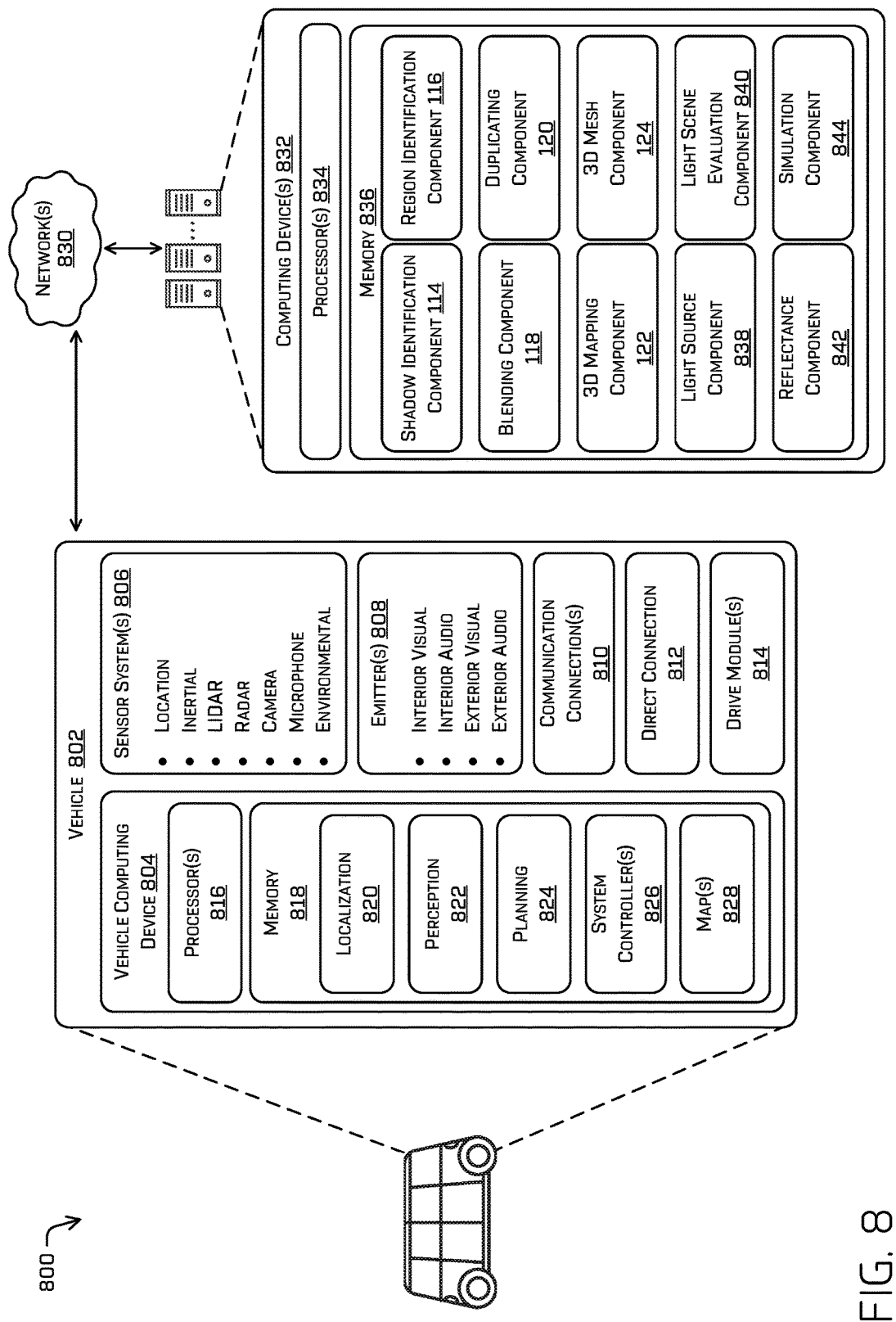
FIG. 8 depicts a block diagram of an example system for implementing the techniques described herein.

FIG. 8 depicts a block diagram of an example system 800 for implementing the techniques described herein. In at least one example, the system 800 can include a vehicle 802, which can be the same vehicle as the vehicles 102, 202, 702, 708, and 710, described above with reference to FIGS. 1, 2, and 7.

The vehicle 802 can include a vehicle computing device 804, one or more sensor systems 806, one or more emitters 808, one or more communication connections 810, at least one direct connection 812, and one or more drive modules 814.

The vehicle computing device 804 can include one or more processors 816 and memory 818 communicatively coupled with the one or more processors 816. In the illustrated example, the vehicle 802 is an autonomous vehicle; however, the vehicle 802 could be any other type of vehicle, or any other system having at least an image capture device (e.g., a camera enabled smartphone). In the illustrated example, the memory 818 of the vehicle computing device 804 stores a localization component 820, a perception component 822, a planning component 824, one or more system controllers 826, and one or more maps 828. Though depicted in FIG. 8 as residing in memory 818 for illustrative purposes, it is contemplated that the localization component 820, the perception component 822, the planning component 824, the one or more system controllers 826, and the one or more maps 828 may additionally, or alternatively, be accessible to the vehicle 802 (e.g., stored remotely).

In at least one example, the localization component 820 can include functionality to receive data from the sensor system(s) 806 to determine a position of the vehicle 802. For example, the localization component 820 can include and/or request/receive a map of an environment and can continuously determine a location of the autonomous vehicle within the map. In some instances, the localization component 820 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 820 can provide data to various components of the vehicle 802 to determine an initial position of an autonomous vehicle for generating a candidate trajectory, as discussed herein.

In some instances, the perception component 822 can include functionality to perform object detection, segmentation, and/or classification. In some examples, the perception component 822 can provide processed sensor data that indicates a presence of an entity that is proximate to the vehicle 802 and/or a classification of the entity as an entity type (e.g., car, pedestrian, cyclist, animal, building, tree, road surface, curb, sidewalk, unknown, etc.). In additional and/or alternative examples, the perception component 822 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 824 can determine a path for the vehicle 802 to follow to traverse through an environment. For example, the planning component 824 can determine various routes and trajectories and various levels of detail. For example, the planning component 824 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 824 can generate an instruction for guiding the autonomous vehicle along at least a portion of the route from the first location to the second location. In at least one example, the planning component 824 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique.

In at least one example, the vehicle computing device 804 can include one or more system controllers 826, which can be configured to control steering, propulsion, braking, safety, emitters, communication, and other systems of the vehicle 802. These system controller(s) 826 can communicate with and/or control corresponding systems of the drive module(s) 814 and/or other components of the vehicle 802.

The memory 818 can further include one or more maps 828 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 828 may include at least one map (e.g., images and/or a mesh) generated in accordance with the techniques discussed herein. In some example, the vehicle 802 can be controlled based at least in part on the maps 828. That is, the maps 828 can be used in connection with the localization component 820, the perception component 822, and/or the planning component 824 to determine a location of the vehicle 802, identify objects in an environment, and/or generate routes and/or trajectories to navigate within an environment.

In some examples, the one or more maps 828 may be stored on a remote computing device(s) (such as the computing device(s) 832) accessible via network(s) 830. In some examples, multiple maps 828 may be stored based on, for example, a characteristic (e.g., type of entity, time of day, day of week, season of the year, etc.). Storing multiple maps 828 may have similar memory requirements, but increase the speed at which data in a heat map may be accessed.

In some instances, aspects of some or all of the components discussed herein may include any models, algorithms, and/or machine learning algorithms. For example, in some instances, the components in the memory 818 (and the memory 836, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 806 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 can include multiple instances of each of these or other types of sensors. For instance, the LIDAR sensors can include individual LIDAR sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the vehicle computing device 804. Additionally or alternatively, the sensor system(s) 806 can send sensor data, via the one or more networks 830, to the one or more computing device(s) at a particular frequency, after a lapse of a predetermined period of time, in near real-time, etc.

The vehicle 802 can also include one or more emitters 808 for emitting light and/or sound, as described above. The emitters 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 can also include one or more communication connection(s) 810 that enable communication between the vehicle 802 and one or more other local or remote computing device(s). For instance, the communication connection(s) 810 can facilitate communication with other local computing device(s) on the vehicle 802 and/or the drive module(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 can include physical and/or logical interfaces for connecting the vehicle computing device 804 to another computing device or a network, such as network(s) 830. For example, the communications connection(s) 810 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 can include one or more drive modules 814. In some examples, the vehicle 802 can have a single drive module 814. In at least one example, if the vehicle 802 has multiple drive modules 814, individual drive modules 814 can be positioned on opposite ends of the vehicle 802 (e.g., the front and the rear, etc.). In at least one example, the drive module(s) 814 can include one or more sensor systems to detect conditions of the drive module(s) 814 and/or the surroundings of the vehicle 802. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 814. In some cases, the sensor system(s) on the drive module(s) 814 can overlap or supplement corresponding systems of the vehicle 802 (e.g., sensor system(s) 806).

The drive module(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 814 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 814. Furthermore, the drive module(s) 814 also include one or more communication connection(s) that enable communication by the respective drive module with one or more other local or remote computing device(s).

In at least one example, the localization component 820, perception component 822, and/or the planning component 824 can process sensor data, as described above, and can send their respective outputs, over the one or more network(s) 830, to one or more computing device(s) 832. In at least one example, the localization component 820, the perception component 822, and/or the planning component 824 can send their respective outputs to the one or more computing device(s) 832 at a particular frequency, after a lapse of a predetermined period of time, in near real-time, etc.

As described above with reference to FIG. 1, and as discussed throughout this disclosure, the vehicle 802 can send sensor data to one or more computing device(s) 832, via the network(s) 830. In some examples, the vehicle 802 can send raw sensor data to the computing device(s) 832. In other examples, the vehicle 802 can send processed sensor data and/or representations of sensor data to the computing device(s) 832. In some examples, the vehicle 802 can send sensor data to the computing device(s) 832 at a particular frequency, after a lapse of a predetermined period of time, in near real-time, etc. In some cases, the vehicle 802 can send sensor data (raw or processed) to the computing device(s) 832 as one or more log files.

The computing device(s) 832 can receive the sensor data (raw or processed) and can generate and/or update maps based on the sensor data. Further, the computing device(s) 832 can identify shadows in images and generate textured 3D maps without shadows. In at least one example, the computing device(s) 832 can include one or more processors 834 and memory 836 communicatively coupled with the one or more processors 834. In the illustrated example, the memory 836 of the computing device(s) 832 stores the shadow identification component 114, the region identification component 116, the blending component 118, the duplicating component 120, the 3D mapping component 122, the 3D mesh component 124, a light source component 838, a light scene evaluation component 840, a reflectance component 842, and a simulation component 844. In at least one example, the computing device(s) 832 can correspond to the computing device(s) 112 of FIG. 1.

The shadow identification component 114 is described above in connection with FIG. 1. In general, the shadow identification component 114 can include a machine learning algorithm trained to detect one or more shadows in image data. In some cases, the shadow identification component 114 can receive geometric information of an environment and a location of a light source as input to the algorithm to detect one or more shadows in image data.

The region identification component 116 is described above in connection with FIG. 1. In general, the region identification component 116 can identify corresponding regions in a set of images. In some instances, the region identification component can map regions based on features in image data, and in some instances, the region identification component 116 can identify regions based on images being projected onto a 3D mesh of an environment.

The blending component 118 is described above in connection with FIG. 1. In general, the blending component 118 can combine regions of image data from a plurality of images to generate an updated region of image data with a contribution of a shadow minimized or omitted.

The duplicating component 120 is described above in connection with FIG. 1. In general, the duplicating component 120 can identify a source of image data to be used to replace image data at a destination region or location. For example, a destination region can correspond to a shadow region of an image, while a source region can correspond to image data that is illuminated (e.g., does not include a shadow) from a corresponding region in another image. In some examples, a source region can be based on image data having similar color values, semantic information, LIDAR intensity, etc.

The 3D mapping component 122 is described above in connection with FIG. 1. In general, the 3D mapping component 122 can map or project image data onto portions of the 3D mesh. That is, the 3D mapping component can project image data captured by an image sensor onto a 3D mesh of the environment that corresponds to the environment represented in the image data.

The 3D mesh component 124 is described above in connection with FIG. 1. In general, the 3D mesh component 124 can receive log files (or sensor data, generally) from one or more vehicles (such as the vehicle 802) and can generate or update a map of an environment. As discussed above, the 3D mesh component 124 can generate a 3D mesh (or other representation, e.g., Signed Distance Function, voxel, voxel hash, etc.) of an environment based on sensor data captured by one or more LIDAR sensors (or other sensors), for example. In some instances, surfaces in a 3D map can be represented by one or more polygons. In some instances, objects can be represented by voxels, histograms, or distribution functions. In some instances, surfaces in a 3D map can be represented by a parameterized entity (e.g., NURBS). In some instances, the 3D mesh component 124 can associate semantic information with individual polygons of the 3D mesh. These and other operations of the 3D mesh component 124 are discussed herein.

The light source component 838 can include functionality to determine a source of light associated with image data. In some instances, the light source component 838 can receive a location of the environment represented in image data (e.g., latitude, longitude, elevation, etc.), time of day, day of the year, and the like to determine where a light source is when capturing an image. In another embodiment, the light source component 838 can be used to determine a location of a light source with respect to a 3D mesh needed to illuminate a portion of the 3D mesh (e.g., to search for image data of a surface not occluded by shadows).

The light scene evaluation component 840 can include functionality to determine, with respect to image data representing an environment, a type of light present in the scene. In some instances, the light scene evaluation component 840 can include a machine learning algorithm trained to detect scenes of diffuse light, such as cloudy days. In some instances, the light scene evaluation component 840 can access weather data associated with a location to determine weather conditions present at a time of capturing one or more images. In some instances, the light scene evaluation component 804 can generate a score associated with an image or with individual regions of an image indicating a diffuse quality of lighting present in the region or image. In some instances, image data representing a cloudy day can be selected for map generation, as discussed herein. In some instances, image data representing a cloudy day can be used without further processing to generate a map, and in some instances, the image data can be selected based at least in part on the score or indication and adjusted using the blending and/or duplicating techniques discussed herein.

The reflectance component 842 can include functionality to determine a reflectance of a surface with respect a surface angle. In some instances, the reflectance component 842 can determine LIDAR intensity data with respect to an angle of incidence of the LIDAR beam for a point on a surface. In some instances, the reflectance component 842 can determine a bidirectional reflectance distribution function (BRDF) for one or more points or surfaces in an environment (and/or a bidirectional scattering-surface reflectance distribution function (BSSRDF)). In some examples, individual points and/or surfaces within an environment can be classified as Lambertian surfaces (e.g., matte, diffuse, etc.), specular surfaces (e.g., glossy), mirrored surfaces, and the like. In some instances, the reflectance characteristics can include a bidirectional reflectance distribution function (BRDF).

In some instances, the reflectance component can generate a BRDF channel for each polygon of a 3D mesh and/or for each pixel of an image associated with the 3D mesh.

The simulation component 844 can include functionality to receive a 3D map with shadows omitted and to project a light source onto the 3D map from an arbitrary location to generate artificial shadows based on the 3D geometry of the environment. In some instances, when a 3D map includes BRDF information for various surfaces, the simulation component 844 can represent reflections of light based on the reflectance of various surfaces. In some instances, the simulation component can simulate photorealistic images of an environment from a textured 3D map with shadows removed, as discussed herein.

The processor(s) 816 of the vehicle 802 and the processor(s) 834 of the computing device(s) 832 can be any suitable processor capable of executing instructions to process data and perform operations as described herein. By way of example and not limitation, the processor(s) 816 and 834 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and memory 836 are examples of non-transitory computer-readable media. Memory 818 and memory 836 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in alternative examples, components of the vehicle 802 can be associated with the computing device(s) 832 and/or components of the computing device(s) 832 can be associated with the vehicle 802. That is, the vehicle 802 can perform one or more of the functions associated with the computing device(s) 832, and vice versa.

FIGS. 1, 3, 4, 6, and 9 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 9:
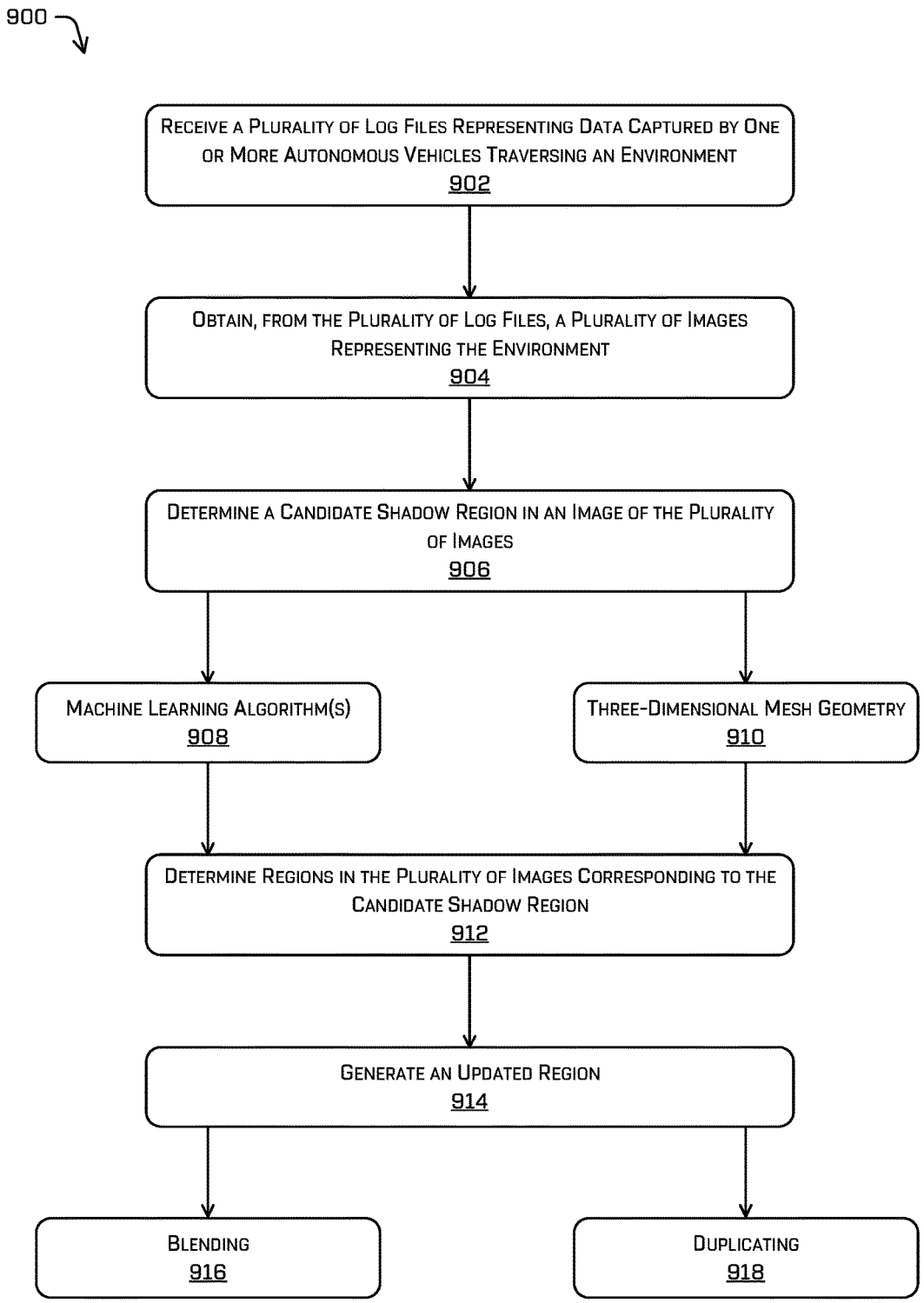
FIG. 9 depicts an example process for generating a map without shadows, as discussed herein.

FIG. 9 depicts an example process 900 for generating a map without shadows, as discussed herein. For example, some or all of the process 900 can be performed by one or more components in FIG. 8, as described herein. For example, some or all of the process 900 can be performed by the computing device(s) 832.

At operation 902, the process can include receiving a plurality of sensor data, which may be stored in one or more log files, representing data captured by one or more autonomous vehicles traversing an environment. In some instances, the sensor data can be captured by non-autonomous vehicles, unmanned aerial vehicles (UAVs), camera enabled smartphones, and the like. In some instances, the plurality of log files can include data captured by one or more sensors including, but not limited to, LIDAR sensors, image sensors, radar sensors, sonar sensors, inertial measurement sensors (IMUs), GPS sensors, magnetometers, gyroscopes, time of flight sensors, and the like. Further, the log files can include segmentation information, classification information, routes and/or trajectories traversed or determined by an autonomous vehicle, and the like.

At operation 904, the process can include obtaining, from the plurality of log files, a plurality of images representing the environment. In some instances, the plurality of images can be captured by each vehicle as it traverses the environment. In some instances, the plurality of images can represent the environment taken from a plurality of locations, perspectives, taken in a variety of weather and/or lighting conditions, and the like. In some instances, the images can represent RAW sensor data (e.g., prior to tone mapping and/or compression).

At operation 906, the process can include determining a candidate shadow region in an image of the plurality of images. In some instances, the operation 906 can include utilizing one or more techniques to determine the candidate shadow regions, such as utilizing one or more machine learning algorithms (operation 909) and/or utilizing three-dimensional mesh geometry (e.g., operation 910).

At operation 908, the process can include utilizing one or more machine learning algorithms to determine one or more candidate shadow regions in an image of the plurality of images. For example, the operation 908 can include providing the image to a machine learning algorithm trained to detect shadow regions in images based on, for example, the image data alone, image data in conjunction with other sensor modalities, and/or image data in conjunction with mesh/map data. In some instances, the machine learning algorithm can be trained by inputting images (and/or additional data described in detail above) with shadow regions annotated in the image as corresponding to a shadow as ground truth data.

At operation 910, the operation can include utilizing three-dimensional mesh geometry to determine one or more candidate shadow regions in the image. For example, as discussed above with respect to FIGS. 4 and 5, the image can be projected onto a 3D mesh and a plurality of rays can be projected from a light source onto the 3D mesh to determine regions of the mesh where the rays intersect with the mesh and to determine regions of the mesh where the rays do not intersect with the mesh. In some instances, a location of a light source can be based on time information and/or location information associated with the image subject to the shadow removal operations.

At operation 912, the process can include determining regions in the plurality of images corresponding to the candidate shadow region. In some instances, the operation 912 can include determining regions in a first image that represent the same aspect of the environment as regions in a second image (e.g., as discussed in connection with FIG. 6). In some instances, the operation 912 can include determining regions in the image (subject to shadow removal) in other images with corresponding texture that may be similar in texture (e.g., color, reflectance, etc.) as the surface in the candidate shadow region.

At operation 914, the process can include generating an updated region. In some instances, the operation 914 can include utilizing blending operations (e.g., operation 919) and/or duplicating operations (e.g., operation 919).

At operation 916, the process can include blending image data from two or more sources to generate an updated region omitting or minimizing a contribution of a shadow, as discussed herein.

At operation 918, the process can include duplicating operations to remove image data including contributions of shadows and replacing the image data with other image data not including such shadows. In some instances, the duplicating operation 918 can include duplicating image data from the same location but from another image (e.g., representing more favorable lighting conditions) and/or can including tiling image data from another location having similar characteristics (e.g., semantic information, LIDAR intensity information, etc.).

In some instances, the process 900 can include generating an updated image (e.g., a composite image) including the updated region. In some instances, the process 900 can include providing a texturized 3D map of an environment with shadows omitted to a simulator for simulating shadows in the environment with any arbitrary lighting.

Example Clauses

A. A system comprising: one or more processors; and one or more computer-readable media storing instructions executable by the one or more processors, wherein executing the instructions causes the system to: receive a plurality of sensor data captured by one or more sensors disposed about autonomous vehicles traversing an environment; obtain, from the sensor data, a plurality of images representing the environment; determine, based at least in part on a machine learning algorithm trained to identify one or more shadow regions in image data, a candidate shadow region in an image of the plurality of images; determine a corresponding region in one or more additional images of the plurality of images; provide the candidate shadow region and the corresponding region to a filtering algorithm to generate an updated region, the updated region representing the candidate shadow region in the image with one or more shadows omitted; generate, based at least in part on the updated region, a composite image including at least a portion of the image and the updated region; and mapping the image or the composite image onto a three-dimensional mesh associated with the environment.

B: The system of paragraph A, wherein the instructions further cause the system to: receive, from the machine learning algorithm, image coordinates identifying the candidate shadow region in the image; and determine, based at least in part on the image coordinates, the corresponding region in the one or more additional images.

C: The system of paragraph A or B, wherein the machine learning algorithm is a first machine learning algorithm, and wherein the instructions further cause the system to: provide the one or more additional images to a second machine learning algorithm trained to identify a lighting condition; receive, from the second machine learning algorithm, a score associated with a the lighting condition for an additional image of the one or more additional images; and generating, based at least in part on the score, the updated region.

D: The system of any of paragraphs A-C, wherein the instructions further cause the system to: extract first image data corresponding to the candidate shadow region from the image; generate the updated region by averaging color values associated with the corresponding region of the one or more additional images; and generate the composite image by adding second image data of the updated region to an area corresponding to the first image data.

E: The system of any of paragraphs A-D, wherein the instructions further cause the system to: provide the composite image to a simulator for rendering a simulated shadow in the composite image.

F: A method comprising: receiving a plurality of images representing an environment from one or more image capture devices; determining a candidate shadow region in a first image of the plurality of images; determining a corresponding region in a second image of the plurality of images; generating, based at least in part on the candidate shadow region and the corresponding region, an updated region representing the candidate shadow region in the first image with one or more shadows omitted; and generating, based at least in part on the updated region, a composite image representing the environment, the composite image including at least a portion of the first image and the updated region.

G: The method of paragraph F, further comprising: texture mapping the composite image onto a three-dimensional mesh representing the environment.

H: The method of paragraph F or G, further comprising: providing the plurality of images to a machine learning algorithm trained to identify a lighting condition in an image of the plurality of images; receiving, from the machine learning algorithm, an indication associated with the lighting condition in the image of the plurality of images; and generating, based at least in part on the indication, the updated region.

I: The method of any of paragraphs F-H, further comprising: providing the first image to a machine learning algorithm trained to identify one or more candidate shadow regions in image data representing shadows; receiving, from the machine learning algorithm, image coordinates identifying the candidate shadow region in the first image; and determining, based at least in part on the image coordinates, the corresponding region in the second image of the plurality of images.

J: The method of any of paragraphs F-I, wherein determining the candidate shadow region comprises: determining a position or orientation of the one or more image capture devices; determining an illumination vector associated with a light source; and determining, based at least in part on a three-dimensional map, an area of the three-dimensional map visible to the one or more image capture devices and not illuminated by the light source, and wherein determining the corresponding region comprises: projecting the area into the second image.

K: The method of any of paragraphs F-J, further comprising: providing the candidate shadow region and the corresponding region to a filtering algorithm to generate an updated region, the updated region representing the candidate shadow region in the first image with one or more shadows at least partially omitted.

L: The method of any of paragraphs F-K, further comprising: determining first semantic information associated with the candidate shadow region; determining second semantic information associated with an adjacent region adjacent to the candidate shadow region in the first image; and generating the updated region based at least in part on the first semantic information and the second semantic information.

M: The method of paragraph L, further comprising: determining that first semantic information is a same as the second semantic information; determining that the adjacent region does not include a shadow; determining texture information associated with the adjacent region; and generating the updated region based at least in part on the texture information and the first semantic information being substantially same as the second semantic information.

N: The method of any of paragraphs F-M, further comprising: obtaining LIDAR data representing the environment, the LIDAR data captured by one or more autonomous vehicles traversing the environment; determining first LIDAR intensity information associated with the candidate shadow region; determining second LIDAR intensity information associated with a region adjacent to the candidate shadow region in the first image; and generating the updated region based at least in part on the first LIDAR intensity information and the second LIDAR intensity information.

O: The method of paragraph N, further comprising: determining, based at least in part on the LIDAR data, a bidirectional reflectance distribution function (BRDF) associated with the candidate shadow region.

P: A non-transitory computer-readable medium storing instructions that, when executed, cause one or more processors to perform operations comprising: receiving a plurality of images representing an environment from an image sensor; determining a candidate shadow region in a first image of the plurality of images; determining a corresponding region in a second image of the plurality of images; generating, based at least in part on the candidate shadow region and the corresponding region, an updated region, the updated region representing the candidate shadow region in the first image with one or more shadows omitted; and generating, based at least in part on the updated region, a composite image representing the environment, the composite image including at least a portion of the first image and the updated region.

Q: The non-transitory computer-readable medium of paragraph P, the operations further comprising: mapping the composite image onto a mesh representing the environment.

R: The non-transitory computer-readable medium of paragraph P or Q, the operations further comprising: providing the first image to a machine learning algorithm trained to identify a candidate shadow region in image data representing a shadow; receiving, from the machine learning algorithm, image coordinates identifying the candidate shadow region in the first image; and determining, based at least in part on the image coordinates and a map, the corresponding region in the second image.

S: The non-transitory computer-readable medium of any of paragraphs P-R, wherein generating the updated region comprises: providing the candidate shadow region and the corresponding region to a filtering algorithm.

T: The non-transitory computer-readable medium of any of paragraphs P-S, the operations further comprising: providing the composite image to a simulator for rendering one or more simulated shadows in the composite image.

AA. A system comprising: one or more processors; and one or more computer-readable media storing instructions executable by the one or more processors, wherein the instructions cause the system to: obtain a three-dimensional (3D) mesh representing an environment; receive a plurality of sensor data representing data captured by one or more image capture devices disposed about one or more autonomous vehicles traversing an environment; receive, from the sensor data, a plurality of images representing the environment; map an image of the plurality of images onto the 3D mesh; determine a location of a light source illuminating the environment; project a ray originating from the location of the light source onto the 3D mesh; determine, based at least in part on an intersection point between the ray and the 3D mesh, a candidate shadow region of the 3D mesh with respect to the light source; and generate, based at least in part on the candidate shadow region, an updated image representing the environment, the updated image corresponding to the image with one or more shadows omitted.

BB: The system of paragraph AA, wherein the instructions further cause the system to: determine image coordinates identifying the candidate shadow region in the image;

and determine, based at least in part on the image coordinates identifying the candidate shadow region in the image, a corresponding region in an additional image of the plurality of images; and determine the updated image by combining at least a portion of the image and at least a portion of the corresponding region.

CC: The system of paragraph AA or BB, wherein determining the location of the light source is based at least in part on first temporal information, wherein the location of the light source is a first location, and wherein the instructions further cause the system to: determine, based at least in part on a geometry of the 3D mesh, second temporal information associated with a second location of the light source for illuminating the candidate shadow region; and select an additional image of the plurality of images based at least in part on the second temporal information.

DD: The system of any of paragraphs AA-CC, wherein the instructions further cause the system to: determine first semantic information associated with the candidate shadow region; determine second semantic information associated with a region adjacent to the candidate shadow region; determine that the first semantic information is substantially same as the second semantic information; and generate the updated image based at least in part on the first semantic information being substantially same as the second semantic information.

EE: The system of any of paragraphs AA-DD, wherein the instructions further cause the system to: obtain LIDAR data associated with the candidate shadow region; and determine, based at least in part on the LIDAR data, a bidirectional reflectance distribution function (BRDF) associated with the candidate shadow region.

FF: A method comprising: obtaining a mesh representing an environment; receiving a plurality of images representing the environment from one or more image capture devices; determining a location of a light source illuminating the environment in an image of the plurality of images; determining, based on a geometry of the mesh and the location of the light source, a candidate shadow region in the image; generating, based at least in part on the candidate shadow region, an updated image representing the environment, the updated image corresponding to the image with one or more shadows at least partially modified; and mapping the image or the updated image onto the mesh.

GG: The method of paragraph FF, further comprising: determining image coordinates identifying the candidate shadow region in the image; and determining, based at least in part on the image coordinates, a corresponding region in an additional image of the plurality of images, the corresponding region comprising data associated with the candidate shadow region; and generating the updated image based at least in part on the corresponding region.

HH: The method of paragraph GG, further comprising: generating the updated image based at least in part on replacing first image data associated with the candidate shadow region with second image data associated with the corresponding region.

II: The method of any of paragraphs FF-HH, further comprising: projecting a ray from the location of the light source onto the mesh to determine an intersection point between the ray and the mesh; and determining the candidate shadow region in the image based at least in part on the intersection point.

JJ: The method of any of paragraphs FF-II, further comprising: providing the plurality of images to a machine learning algorithm trained to identify a lighting condition in an individual image of the plurality of images; receiving, from the machine learning algorithm, a score associated with the lighting condition in the individual image of the plurality of images; and generating, based at least in part on the score, the updated image.

KK: The method of any of paragraphs FF-JJ, further comprising: extracting first image data corresponding to the candidate shadow region from the image; and generating the updated image by adding second image data to an area corresponding to the first image data, the second image data based at least in part on semantic information associated with the candidate shadow region.

LL: The method of any of paragraphs FF-KK, further comprising: obtaining LIDAR information associated with the environment; and associating LIDAR intensity information as a function of an angle of incidence with an area of the mesh.

MM: The method of paragraph LL, further comprising: determining a bidirectional reflectance distribution function associated with the area.

NN: The method of any of paragraphs FF-MM, wherein the one or more image capture devices are disposed about one or more autonomous vehicles traversing the environment, and wherein the method further comprises controlling the one or more autonomous vehicles to navigate within the environment based at least in part on the mesh.

OO: The method of any of paragraphs FF-NN, further comprising: mapping the updated image to the mesh to obtain a textured mesh; and providing the textured mesh to a simulator for rendering one or more simulated shadows on the textured mesh.

PP: A non-transitory computer-readable medium storing instructions that, when executed, cause one or more processors to perform operations comprising: obtaining a mesh representing an environment; receiving a plurality of images representing the environment from an image capture device; determining a location of a light source illuminating the environment; determining, based on a geometry of the mesh, the location of the light source, and a pose of the image capture device, a candidate shadow region in an image of the plurality of images; and generating, based at least in part on the candidate shadow region, an updated image representing the environment, the updated image corresponding to the image with one or more shadows at least partially modified.

QQ: The non-transitory computer-readable medium of paragraph PP, the operations further comprising: determining image coordinates identifying the candidate shadow region in the image; determining, based at least in part on the image coordinates, a corresponding region in an additional image of the plurality of images, the corresponding region associated with the candidate shadow region; and generating the updated image based at least in part on the corresponding region.

RR: The non-transitory computer-readable medium of paragraph PP or QQ, the operations further comprising: projecting a ray from the location of the light source onto the mesh to determine an intersection point of the ray and the mesh; and determining the candidate shadow region in the image based at least in part on the intersection point.

SS: The non-transitory computer-readable medium of any of paragraphs PP-RR, the operations further comprising: extracting first image data corresponding to the candidate shadow region from the image; and generating the updated image by adding second image data to an area corresponding to the first image data, the second image data based at least in part on semantic information associated with the candidate shadow region.

TT: The non-transitory computer-readable medium of any of paragraphs PP-SS, the operations further comprising: mapping the updated image to the mesh to obtain a textured mesh; and providing the textured mesh to a simulator for rendering one or more simulated shadows on the textured mesh.

While the example clauses described above are described with respect to one particular implementation, it should be understood that, in the context of this document, the content of the example clauses can also be implemented via a method, device, system, and/or a computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions cause the system to:
obtain a three-dimensional (3D) mesh representing an environment;
receive a plurality of sensor data representing data captured by one or more image capture devices disposed about one or more autonomous vehicles traversing the environment;
receive, from the plurality of sensor data, a plurality of images representing the environment;
map an image of the plurality of images onto the 3D mesh;
determine a first location of a light source illuminating the environment;
project a ray originating from the first location of the light source onto the 3D mesh;
determine, based at least in part on an intersection point between the ray and the 3D mesh and on first temporal information, a candidate shadow region of the 3D mesh with respect to the light source;
determine, based at least in part on a geometry of the 3D mesh, second temporal information associated with a second location of the light source for illuminating the candidate shadow region, wherein the second location is different than the first location;
select an additional image of the plurality of images based at least in part on the second temporal information; and
generate, based at least in part on the candidate shadow region and the additional image, an updated image representing the environment, the updated image corresponding to the image with one or more shadows omitted.

2. The system of claim 1, wherein the instructions further cause the system to:
determine image coordinates identifying the candidate shadow region in the image; and
determine, based at least in part on the image coordinates identifying the candidate shadow region in the image, a corresponding region in the additional image of the plurality of images; and
determine the updated image by combining at least a portion of the image and at least a portion of the corresponding region.

3. The system of claim 1, wherein the instructions further cause the system to:
determine first semantic information associated with the candidate shadow region;
determine second semantic information associated with a region adjacent to the candidate shadow region;
determine that the first semantic information is substantially same as the second semantic information; and
generate the updated image based at least in part on the first semantic information being substantially same as the second semantic information.

4. The system of claim 1, wherein the instructions further cause the system to:
obtain LIDAR data associated with the candidate shadow region; and
determine, based at least in part on the LIDAR data, a bidirectional reflectance distribution function (BRDF) associated with the candidate shadow region.

5. The system of claim 1, wherein the instructions further cause the system to:
determine the candidate shadow region further based at least in part on a pose of an image capture device of the one or more image capture devices.

6. A method comprising:
obtaining a mesh representing an environment;
receiving a plurality of images representing the environment from one or more image capture devices;
determining a first location of a first light source illuminating the environment in an image of the plurality of images;
projecting a ray originating from the first location of the first light source onto the mesh;
determining, based at least in part on an intersection point between the ray and the mesh, a candidate shadow region in the image;
determining, based at least in part on the intersection point, a second location of a second light source for illuminating the candidate shadow region, wherein the second location is different than the first location;
selecting an additional image of the plurality of images based at least in part on the second location of the second light source;
generating, based at least in part on the candidate shadow region and the additional image, an updated image representing the environment, the updated image corresponding to the image with one or more shadows at least partially modified; and
mapping the image or the updated image onto the mesh.

7. The method of claim 6, further comprising:
determining image coordinates identifying the candidate shadow region in the image; and
determining, based at least in part on the image coordinates, a corresponding region in the additional image of the plurality of images, the corresponding region comprising data associated with the candidate shadow region; and
generating the updated image based at least in part on the corresponding region.

8. The method of claim 7, further comprising:
generating the updated image based at least in part on replacing first image data associated with the candidate shadow region with second image data associated with the corresponding region.

9. The method of claim 6, further comprising:
providing the plurality of images to a machine learning algorithm trained to identify a lighting condition in an individual image of the plurality of images;
receiving, from the machine learning algorithm, a score associated with the lighting condition in the individual image of the plurality of images; and
generating, based at least in part on the score, the updated image.

10. The method of claim 6, further comprising:
extracting first image data corresponding to the candidate shadow region from the image; and
generating the updated image by adding second image data to an area corresponding to the first image data, the second image data based at least in part on semantic information associated with the candidate shadow region.

11. The method of claim 6, further comprising:
obtaining LIDAR information associated with the environment; and
associating LIDAR intensity information as a function of an angle of incidence with an area of the mesh.

12. The method of claim 11, further comprising:
determining a bidirectional reflectance distribution function associated with the area.

13. The method of claim 6, wherein the one or more image capture devices are disposed about one or more autonomous vehicles traversing the environment, and wherein the method further comprises controlling the one or more autonomous vehicles to navigate within the environment based at least in part on the mesh.

14. The method of claim 6, further comprising:
mapping the updated image to the mesh to obtain a textured mesh; and
providing the textured mesh to a simulator for rendering one or more simulated shadows on the textured mesh.

15. The method of claim 6, wherein the first light source is a same light source as the second light source.

16. A non-transitory computer-readable medium storing instructions that, when executed, cause one or more processors to perform operations comprising:
obtaining a mesh representing an environment;
receiving a plurality of images representing the environment from an image capture device;
determining a first location of a first light source illuminating the environment;
projecting a ray originating from the first location of the first light source onto the mesh;
determining, based at least in part on an intersection point between the ray and the mesh, a candidate shadow region in an image of the plurality of images;
determining, based at least in part on the intersection point, a second location of a second light source for illuminating the candidate shadow region, wherein the second location is different than the first location;
selecting an additional image of the plurality of images based at least in part on the second location of the second light source; and
generating, based at least in part on the candidate shadow region and the additional image, an updated image representing the environment, the updated image corresponding to the image with one or more shadows at least partially modified.

17. The non-transitory computer-readable medium of claim 16, the operations further comprising:
determining image coordinates identifying the candidate shadow region in the image;
determining, based at least in part on the image coordinates, a corresponding region in the additional image of the plurality of images, the corresponding region associated with the candidate shadow region; and
generating the updated image based at least in part on the corresponding region.

18. The non-transitory computer-readable medium of claim 16, the operations further comprising:
extracting first image data corresponding to the candidate shadow region from the image; and
generating the updated image by adding second image data to an area corresponding to the first image data, the second image data based at least in part on semantic information associated with the candidate shadow region.

19. The non-transitory computer-readable medium of claim 16, the operations further comprising:
mapping the updated image to the mesh to obtain a textured mesh; and
providing the textured mesh to a simulator for rendering one or more simulated shadows on the textured mesh.

20. The non-transitory computer-readable medium of claim 16, wherein the first light source is a same light source as the second light source.

* * * * *